US010972731B2

(12) United States Patent
Wang et al.

(10) Patent No.: US 10,972,731 B2
(45) Date of Patent: Apr. 6, 2021

(54) SYSTEMS AND METHODS FOR CODING IN SUPER-BLOCK BASED VIDEO CODING FRAMEWORK

(71) Applicant: InterDigital Madison Patent Holdings, SAS, Paris (FR)

(72) Inventors: Miaohui Wang, Shatin (CN); Yuwen He, San Diego, CA (US); Yan Ye, San Diego, CA (US); Xiaoyu Xiu, San Diego, CA (US)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 15/775,114

(22) PCT Filed: Nov. 10, 2016

(86) PCT No.: PCT/US2016/061379
§ 371 (c)(1),
(2) Date: May 10, 2018

(87) PCT Pub. No.: WO2017/083553
PCT Pub. Date: May 18, 2017

(65) Prior Publication Data
US 2018/0324420 A1  Nov. 8, 2018

Related U.S. Application Data

(60) Provisional application No. 62/253,490, filed on Nov. 10, 2015.

(51) Int. Cl.
*H04N 19/119* (2014.01)
*H04N 19/14* (2014.01)
(Continued)

(52) U.S. Cl.
CPC ......... *H04N 19/119* (2014.11); *H04N 19/103* (2014.11); *H04N 19/14* (2014.11);
(Continued)

(58) Field of Classification Search
CPC ... H04N 19/119; H04N 19/103; H04N 19/147
See application file for complete search history.

(56) References Cited

U.S. PATENT DOCUMENTS

2011/0292999 A1* 12/2011 Jeong ..................... H04N 19/46
375/240.12
2013/0039422 A1* 2/2013 Kirchhoffer ......... H04N 19/176
375/240.13
(Continued)

FOREIGN PATENT DOCUMENTS

WO    WO 2009/051719 A2    4/2009
WO    WO 2010/039731 A2    4/2010

OTHER PUBLICATIONS

Boyce et al., "Draft High Efficiency Video Coding (HEVC) Version 2, Combined Format Range Extensions (RExt), Scalability (SHVC), and Multi-View (MV-HEVC) Extensions", Document: JCTVC-R1013_v1, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, 382 pages.
(Continued)

*Primary Examiner* — Mainul Hasan
(74) *Attorney, Agent, or Firm* — Condo Roccia Koptiw LLP

(57) ABSTRACT

Systems and methods are provided for video coding (e.g., encoding and/or decoding). A coding device may include a processor. The processor may be configured to receive a video frame and partition the video frame into a super
(Continued)

coding units (SCUs). The processor may be configured to partition each of the SCUs into coding tree units (CTUs) based on a coding mode.

21 Claims, 15 Drawing Sheets

(51) Int. Cl.
  *H04N 19/174* (2014.01)
  *H04N 19/103* (2014.01)
  *H04N 19/70* (2014.01)
  *H04N 19/147* (2014.01)
(52) U.S. Cl.
  CPC ......... *H04N 19/147* (2014.11); *H04N 19/174* (2014.11); *H04N 19/70* (2014.11)

(56) References Cited

U.S. PATENT DOCUMENTS

| | | | | |
|---|---|---|---|---|
| 2013/0039423 A1* | 2/2013 | Helle | ............ | H04N 19/119 375/240.13 |
| 2013/0094569 A1 | 4/2013 | Chong et al. | | |
| 2013/0136167 A1 | 5/2013 | Chong et al. | | |
| 2013/0136179 A1* | 5/2013 | Lim | ............ | H04N 19/15 375/240.13 |
| 2013/0163664 A1* | 6/2013 | Guo | ............ | H04N 19/157 375/240.12 |
| 2013/0308701 A1* | 11/2013 | Chen | ............ | H04N 19/44 375/240.12 |
| 2015/0016523 A1* | 1/2015 | Puri | ............ | H04N 19/31 375/240.12 |
| 2015/0189284 A1* | 7/2015 | Alshina | ............ | H04N 19/13 375/240.02 |
| 2015/0381980 A1* | 12/2015 | Tsuchiya | ............ | H04N 19/176 375/240.02 |
| 2017/0188028 A1* | 6/2017 | Park | ............ | H04N 19/188 |
| 2018/0139453 A1* | 5/2018 | Park | ............ | H04N 19/176 |

OTHER PUBLICATIONS

Bross et al., "JCT-VC AHG Report: HEVC Draft and Test Model editing (AHG 2)", AHG, Document: JCTVC-L0002, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, pp. 1-5.

Chen et al., "AHG6: ALF With Non-Normative Encoder-Only Improvements", Document: JCTVC-J0048, MediaTek Inc., Toshiba Corporation, Qualcomm Inc., Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, pp. 1-6.

Chen et al., "AHG6: Further Cleanups and Simplifications of the ALF in JCTVC-J0048", Document: JCTVC-J0390, MediaTek Inc., Toshiba Corporation, Qualcomm Inc., Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, pp. 1-4.

Chiu et al., "Adaptive (Wiener) Filter for Video Compression", ITU-T SG16 Contribution, C437, Geneva, Apr. 2008, 7 pages.

Chong et al., "AHG6: ALF in HM80", Document: JCTVC-K0273, Qualcomm Inc., MediaTek Inc., Toshiba Corporation, Joint Collaborative Team on Video Coding (JCT-VC) of ITU-T SG 16 WP 3 and ISO/IEC JTC 1/SC 29/WG 11, 11th Meeting: Shanghai, CN, Oct. 10-19, 2012, pp. 1-5.

Chujoh et al., "Adaptive Loop Filter for Improving Coding Efficiency", ITU-T SG16 Contribution, C402, Geneva, Apr. 2008, 3 pages.

Chujoh et al., "Block-Based Adaptive Loop Filter", Document VCEG-AI18, ITU Q.6/SG16 (VCEG), Jul. 16-18, 2008, pp. 1-6.

Chujoh et al., "Quadtree-Based Adaptive Loop Filter", ITU-T SG16 Contribution, C181, Geneva, Jan. 2009, 4 pages.

Fu et al., "Sample Adaptive Offset for HEVC", IEEE 13th International Workshop on Multimedia Signal Processing, Hangzhou, 2011, 5 pages.

Fu et al., "Sample Adaptive Offset in the HEVC Standard", IEEE Transactions on Circuits and Systems for Video Technology, vol. 22, No. 12, Dec. 2012, pp. 1755-1764.

HEVC, "HEVC Software", HM reference software 16.0, Available at https://hevc.hhi.fraunhofer.de/svn/svn_HEVCSoftware/tags/HM-16.0 , Dec. 2014, 1 page.

HEVC, "HEVC Software", HM reference software HM7.0, Available at https://hevc.hhi.fraunhofer.de/svn/svn_HEVCSoftware/tags/HM-7.0 , Jul. 2012, 1 page.

Huang et al., "Improvement of Quadtree-Based Adaptive Loop Filter", ITU-T SG16 Q.6 Document, VCEG-AL24, Geneva, Switzerland, Jul. 2009, 7 pages.

ITUT-T, "Advanced Video Coding for Generic Audiovisual Services", ITU-T Rec H.264 and ISO/IEC/MPEG 4 part 10, Nov. 2007, 563 pages.

Karczewicz et al., "Video Coding Technology Proposal by Qualcomm Inc.", Document: JCTVC-A121, Qualcomm Inc., Joint Collaborative Team on Video Coding (JCT-VC) of ITU-T SG16 WP3 and ISO/IEC JTC1/SC29/WG11, 1st Meeting: Dresden, DE, Apr. 15-23, 2010, pp. 1-24.

Marpe et al., "Video Compression Using Nested Quadtree Structures, Leaf Merging, and Improved Techniques for Motion Representation and Entropy Coding", IEEE Transactions on Circuits and Systems for Video Technology, vol. 20, No. 12, Dec. 2010, pp. 1676-1687.

Sullivan et al., "Overview of the High Efficiency Video Coding (HEVC) Standard", IEEE Transactions on Circuits and Systems for Video Technology, vol. 22, No. 12, Dec. 2012, pp. 1649-1668.

Tsai et al., "Adaptive Loop Filtering for Video Coding", IEEE Journal of Selected Topics in Signal Processing, vol. 7, No. 6, Dec. 2013, pp. 934-945.

VCEG, "KTA 2.7 Software", Online Available: http://iphome.hhi.de/suehring/tml/download/KTA/jm11.0kta2.7.zip , May 29, 2015.

Wiegand et al., "Overview of the H.264/AVC Video Coding Standard", IEEE Transactions on Circuits and Systems for Video Technology, vol. 13, No. 7, Jul. 2003, pp. 560-576.

Winken et al., "Transform Coding in the HEVC Test Model", 18th IEEE International Conference on Image Processing (ICIP), 2011, pp. 3693-3696.

\* cited by examiner

SYSTEMS AND METHODS FOR CODING IN SUPER-BLOCK BASED VIDEO CODING FRAMEWORK

CROSS-REFERENCE TO RELATED APPLICATIONS

This application is the National Stage Entry under 35 U.S.C. § 371 of Patent Cooperation Treaty Application No. PCT/US2016/061379, filed Nov. 10, 2016, which claims priority to U.S. Provisional Patent Application Ser. No. 62/253,490, filed Nov. 10, 2015, each of which is entitled "CODING METHODS IN SUPER-BLOCK BASED VIDEO CODING FRAMEWORK," and each of which is incorporated herein by reference in its entirety.

BACKGROUND

Video coding systems may be used to compress digital video signals, e.g., to reduce the amount of storage and/or transmission bandwidth. Video coding systems may include block-based, wavelet-based, object-based and block-based hybrid systems. Examples of block-based video coding systems may include international video coding standards, e.g., the MPEG-1/2/4 part 2, H.264/MPEG-4 part 10 AVC and latest High Efficiency Video Coding (HEVC) standards.

SUMMARY

Systems and methods for video coding (e.g., encoding and/or decoding) are described. A coding device may include a processor. The processor may be configured to receive a decoding mode indicator that may indicate one or more decoding modes. One of such decoding modes may indicate that a super coding unit (SCU) is to be partitioned into equally sized sub-blocks. Such sub-blocks may be N×N equally sized sub-blocks wherein N is greater than or equal to 2. Another of such decoding modes may indicate that an SCU is to be partitioned into variably sized sub-blocks. The processor may further be configured to receive an SCU and determine a decoding mode based on the decoding mode indicator. The processor may decode the SCU based on the determined decoding mode. Similar methods are also described.

A coding device may include a processor that may be configured to receive a video frame comprising a plurality of SCUs. The processor may be further configured to select a coding mode from among a plurality of coding modes for an SCU from among the plurality of SCUs. One coding mode from among the plurality of coding modes may indicate that the SCU is to be partitioned into equally sized sub-blocks. Such sub-blocks may be N×N equally sized sub-blocks wherein N is greater than or equal to 2. Another coding mode from among the plurality of coding modes may indicate that the SCU is to be partitioned into variably sized sub-blocks. The processor may be further configured to partition the SCU into a plurality of sub-blocks based on the selected coding mode and encode the SCU with an indication of the coding mode. Similar methods are also described.

DETAILED DESCRIPTION

Figure 1A:
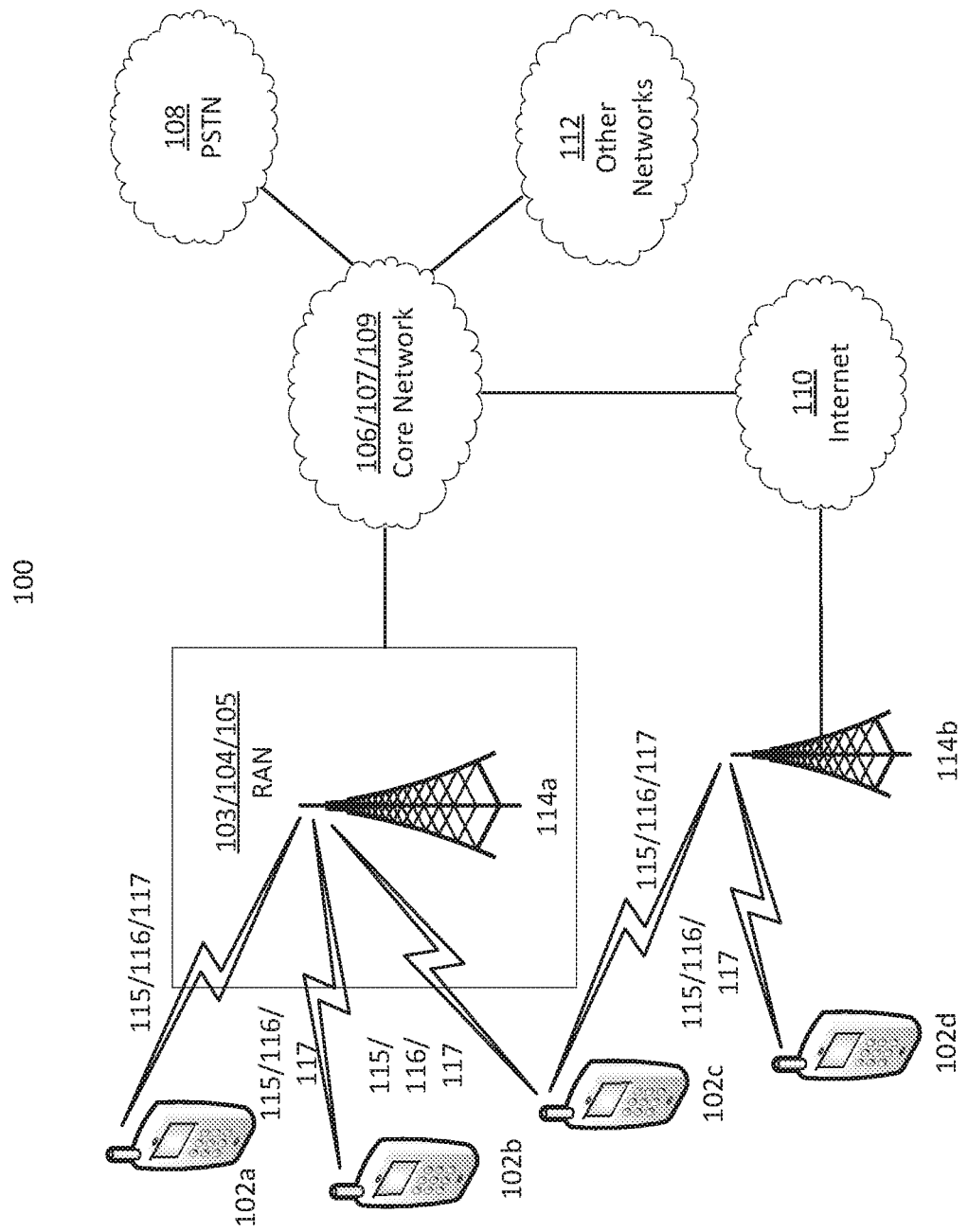
FIG. 1A is a system diagram of an example communications system in which the disclosed subject matter may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA, may include communication protocols such as High-Speed Packet Access (HSPA) and/or Evolved HSPA (HSPA+), HSPA may include High-Speed Downlink Packet Access (HSDPA) and/or High-Speed Uplink Packet. Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other examples, base station 114a and WTRUs 102a, 102b, 102c may implement radio technologies such as IEEE: 802.16 (e.g., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE. LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
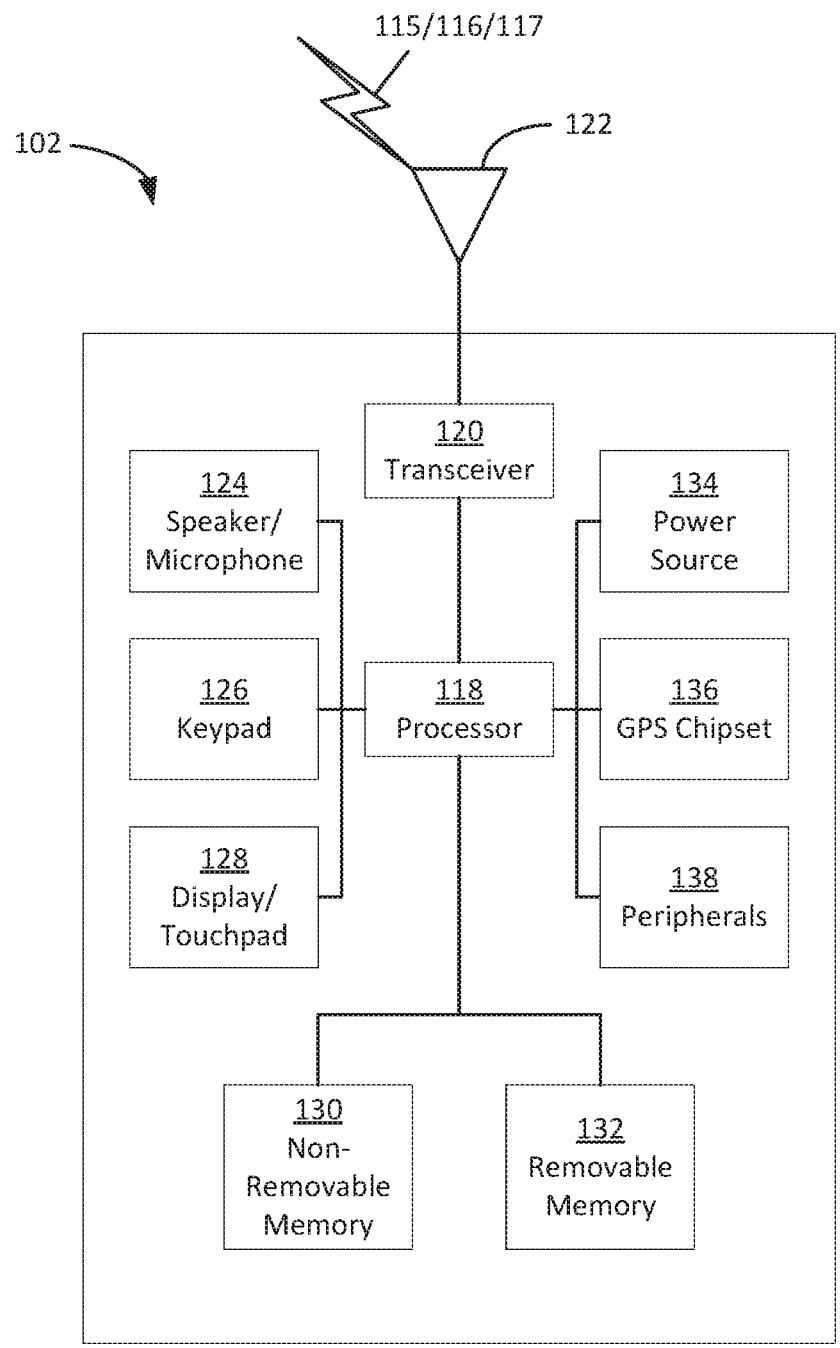
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a ) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RE and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to he transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD)) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality, and/or wired or wireless connectivity. For example, the peripherals 138 may include an accelerometer, an c-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
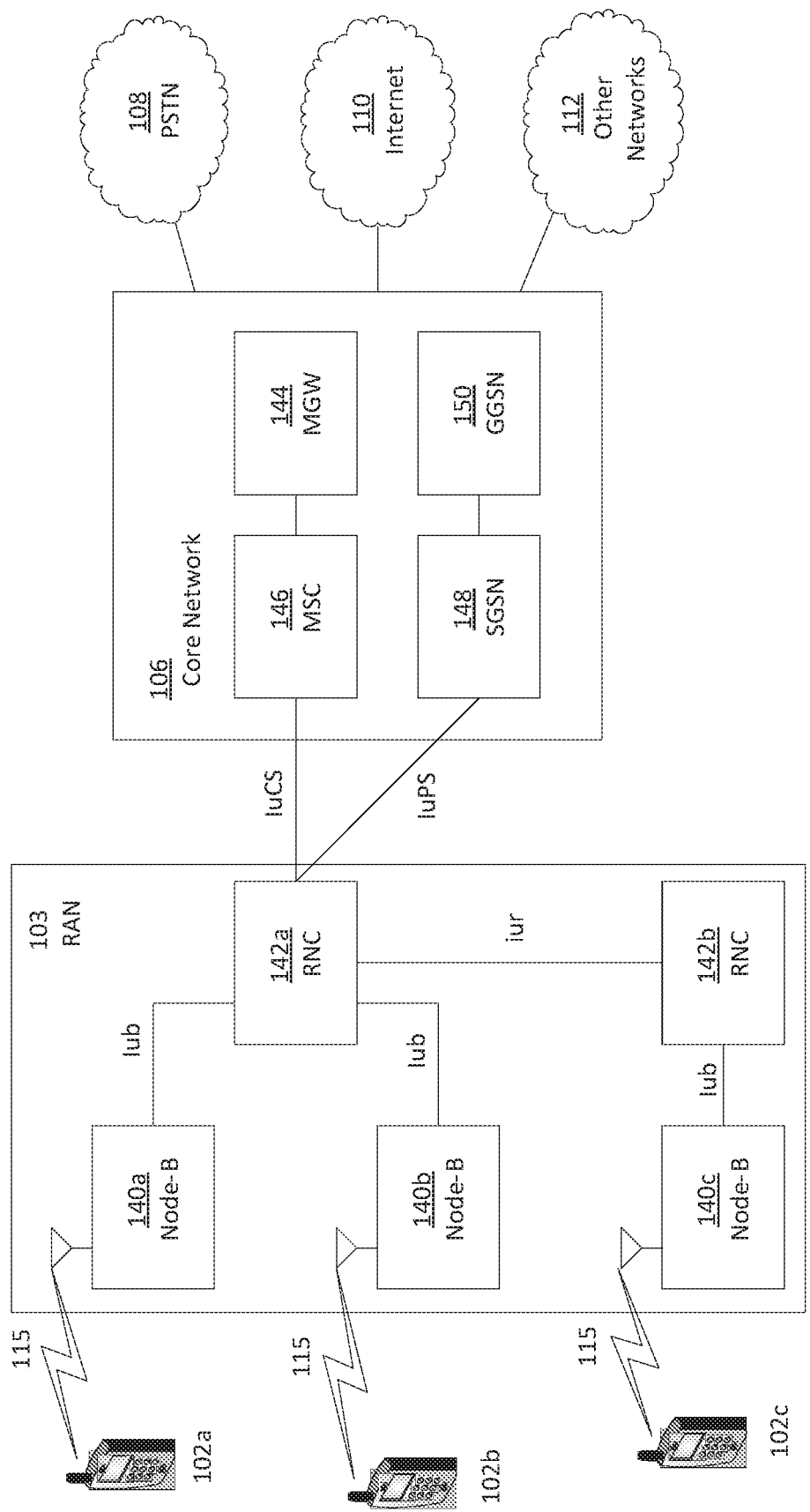
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b.

The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
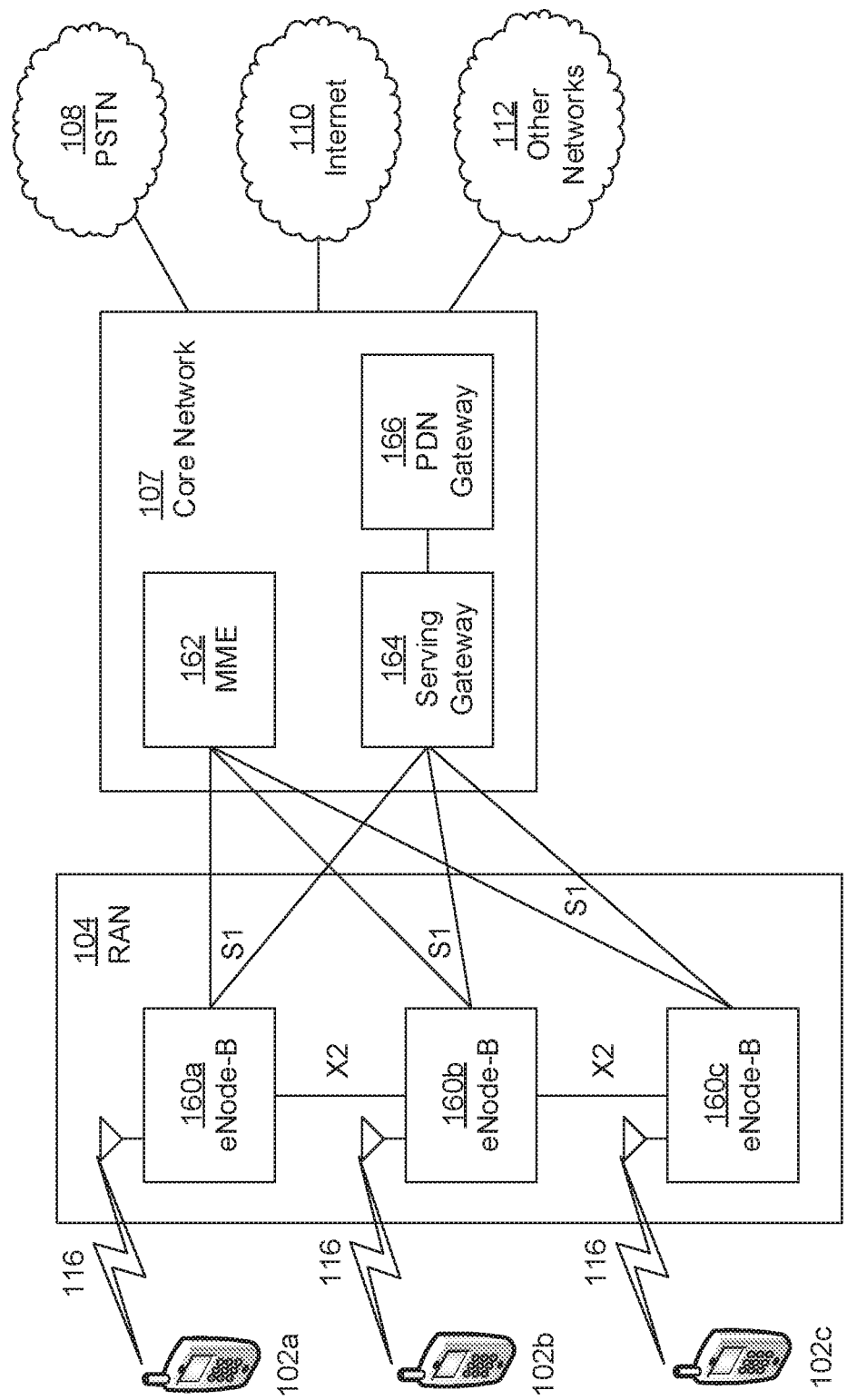
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
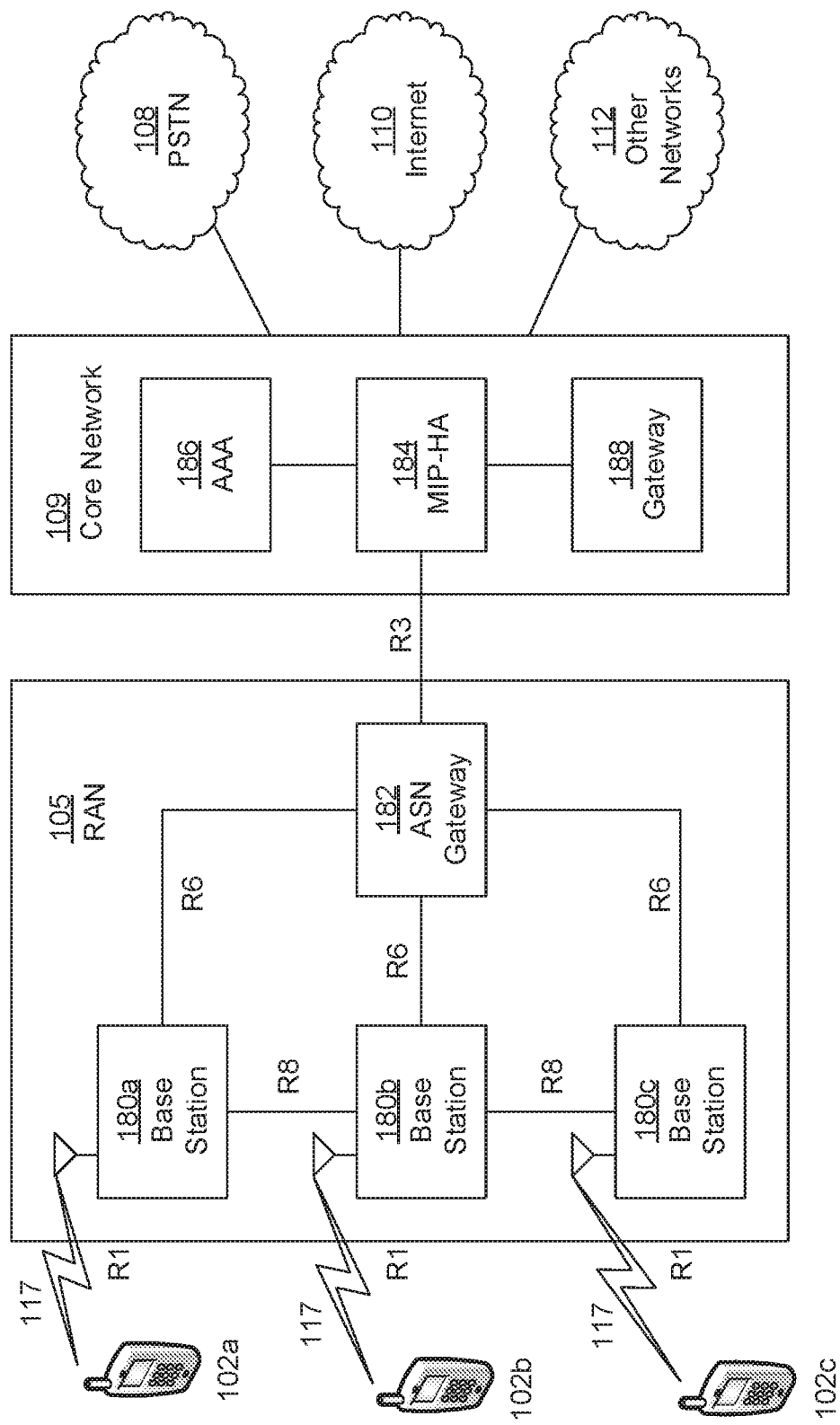
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a, The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Video coding systems may be used to compress digital video signals in an effort to reduce amounts of storage and transmission bandwidth. Among the various types of video coding systems, which may include block-based, wavelet-based, and object-based video coding systems, block-based hybrid video coding systems are widely used and deployed. Examples of block-based video coding systems include video coding systems that may conform to one or more standards such as Moving Picture Experts Group (MPEG)-1/2/4 part 2, H.264/MPEG-4 part 10 Advanced Video Coding (AVC), and High Efficiency Video Coding (HEVC) standards.

Figure 2:
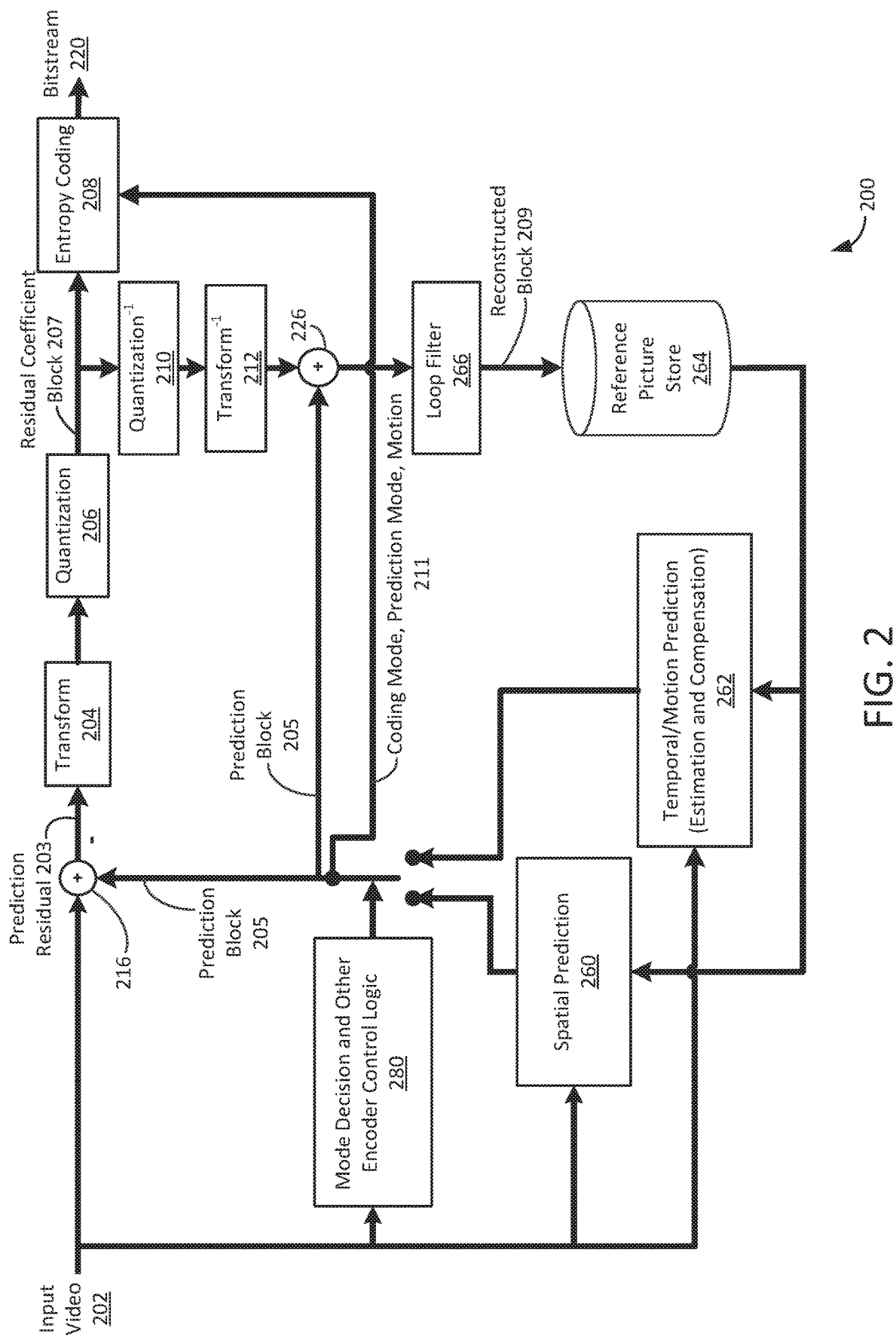
FIG. 2 shows an example block diagram of a block-based video encoder.

FIG. 2 shows a block diagram of exemplary block-based hybrid video encoding system 200 (e.g., a generic block-based hybrid video encoding system). Input video signal 202 may be processed in a block-by-block manner. For example, a basic block unit (e.g., a macroblock (MB)) may include 16×16 pixels. A picture may be coded by coding tree units (CTU) that may have equal size (e.g., 64×64). Such a CTU may be further divided into coding units (CU) that may use quad-tree partitioning. A CU size may be up to 64×64 pixels. A CU size may be partitioned into prediction units (PUs). One or more prediction parameters applied to each PU may be different from one or more prediction parameters applied to another PU. For each input video block (e.g., an MB and/or a CU), spatial prediction 260 and/or temporal prediction 262 may be performed.

Spatial prediction (e.g., "intra-prediction") may use pixels from neighboring blocks (e.g., already coded neighboring blocks) in a video picture/slice (e.g., a same video picture/slice) to predict a current video block. Spatial prediction may reduce spatial redundancy that may be inherent in a video signal. Temporal prediction (e.g., "inter-prediction" or "motion compensated prediction") may use pixels from video pictures (e.g., one or more previously coded video pictures) to predict a current video block. Temporal prediction may be used to reduce temporal redundancy that may be inherent in a video signal.

Temporal prediction (e.g., temporal prediction for a video block) may be represented by one or more motion vectors that may specify an amount and/or a direction of motion between a current block and its reference block. For example, if multiple reference pictures are supported, a reference picture index for each motion vector may be signaled (e.g., signaled additionally). The reference index may also, or instead, be used to identify a reference picture in a reference picture store, such as reference picture store 264 shown in FIG. 2.

Mode decision block 280 (e.g., after spatial prediction 260 and/or temporal prediction 262) may choose a prediction mode (e.g., a prediction mode determined to be the most optimal) on the encoder side. A prediction block may be subtracted 216 from a current video block. Prediction residual block 203 may be transformed 204 and/or quantized 206. Quantized coefficients (e.g., residual coefficient block 207) may be inverse quantized 210 and/or inverse transformed 212, for example, to reconstruct an original residual. An original residual may be added 226 back to prediction block 205, in an example, to form reconstructed video block 209.

In generating reconstructed video block 209, loop filter 266, which may include one or more of a deblocking filter (DF), a sample adaptive offset (SAO), and an adaptive loop filter (ALF), may be applied to such a reconstructed block, e.g., before reconstructed video block 209 is placed in reference picture store 264 and/or referenced by coding associated with future frames. A coding mode (e.g., inter-prediction or intra-prediction), prediction mode information, motion information, and/or quantized residual coefficients 211 may be sent to entropy coding unit 208 where such information may be compressed and/or packed, for example, to form output video bitstream 220.

Figure 3:
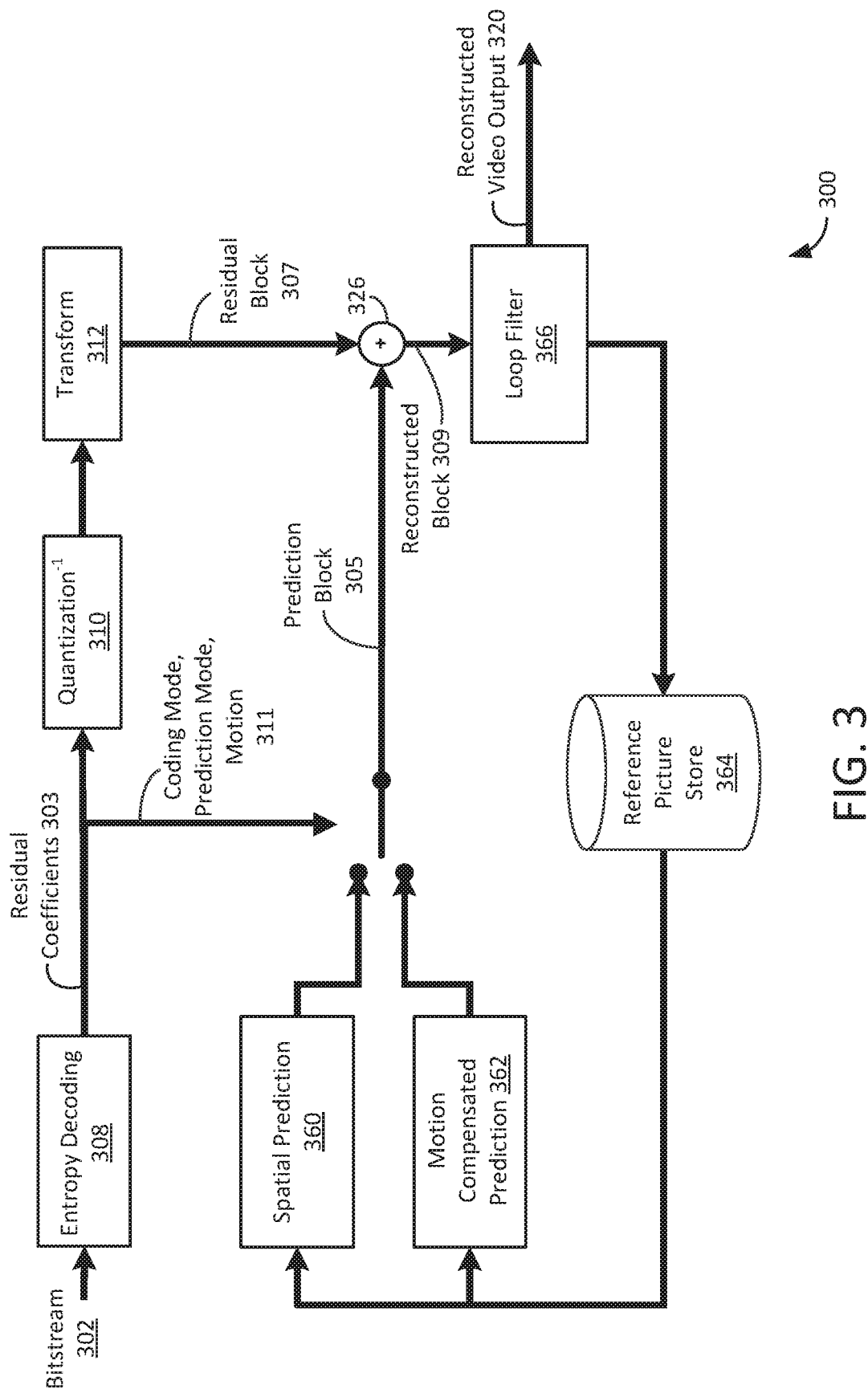
FIG. 3 shows an example block diagram of a block-based video decoder.

FIG. 3 shows a block diagram of exemplary block-based video decoding system 300 (e.g., a generic block-based video decoding system). Input video bitstream 302 may be unpacked and/or entropy decoded by entropy decoding unit 308. A coding mode and/or prediction information 311 may be sent to spatial prediction unit 360 and/or temporal/motion compensated prediction unit 362, for example, to perform intra-and/or inter-prediction that may be used to generate prediction block 305.

Residual transform coefficients 303 may be sent to inverse quantization unit 310 and/or to inverse transform unit 312 to facilitate the reconstruction of residual block 307. Prediction block 305 and/or residual block 307 may be added together at joint point 326. Resulting reconstructed block 309 may be processed by loop filter 366, e.g., before reconstructed block 309 may be stored in, or otherwise provided to, reference picture store 364. Reconstructed video output 320 may be sent, for example, to drive a display device. Reconstructed video output 320 may also, or instead, be used to predict future video blocks.

A video sequence may be encoded frame-by-frame. Each frame may he represented by one or multiple "planes." Three planes may be used to represent the luminance (Y) and chrominance (Cb and/or Cr) color space components. Alternatively, or in addition, three planes may be used to represent luminance (Y) and chrominance (U and/or V) color space components.

A Y-component may be sensitive o a human vision system. A Y-component may be compressed according to a first encoding setting that may be different from a second encoding setting that may be used to compress one or more Cb and/or Cr components. A frame may be divided into blocks (e.g., smaller blocks) with variable-sizes for prediction, transformation, quantization, and/or entropy coding, for example, for each plane. An input video frame may include information associated with the three planes (Y, Cb, Cr) and/or (Y, U, V) associated with the input video frame.

Figure 4:
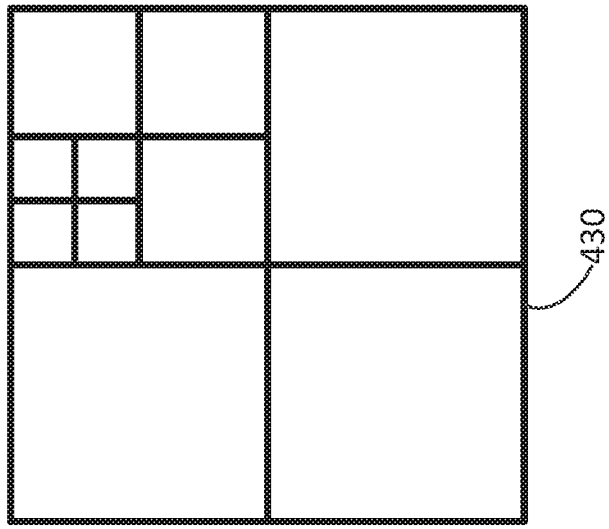
FIG. 4 shows example coding tree block partitions.
Figure 4:
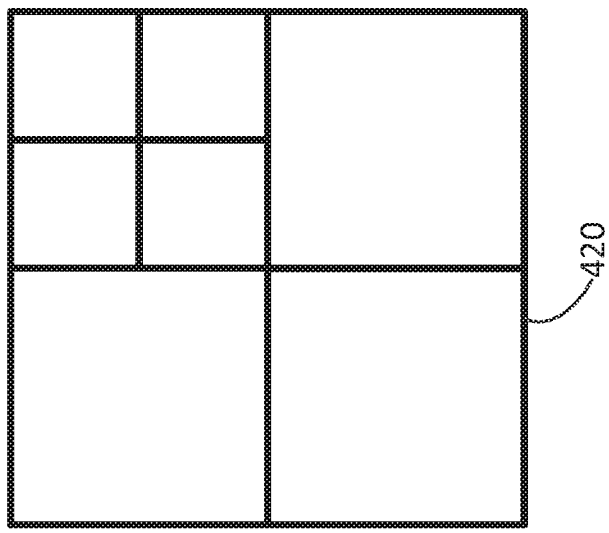
Figure 4:
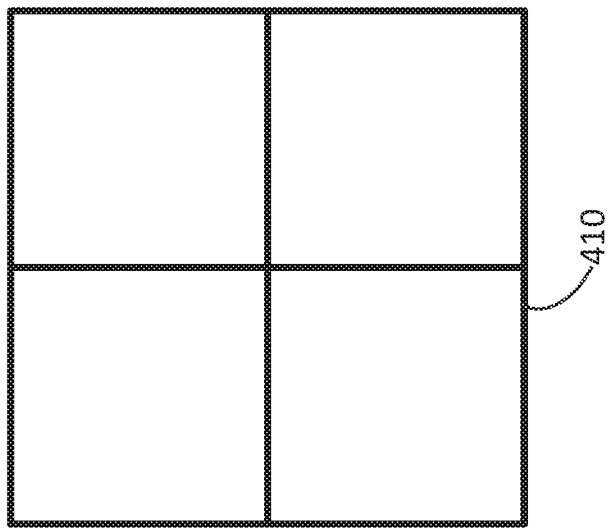

An input frame may be divided into coding tree blocks (CTBs). A size of a CTB may be a power of two and may be specified as side information in a bitstream. A CTB may be sub-divided (e.g., recursively sub-divided) into coding blocks (CBs) that may be smaller than the CTB, where the CTB may correspond to a root node and/or each CB may correspond to a leaf node. FIG. 4 shows diagrams illustrating a nonlimiting example of a CTB that may be divided into CBs. Diagram 410 illustrates the division of a CTB into four CBs. Diagram 420 illustrates an upper-right portion of a CTB that may be may be divided into four smaller CBs. Diagram 430 illustrates an upper-left portion of a CB such as that illustrated in diagram 420, where an upper-right portion of a CTB that may be may be divided into four smaller CBs may be further divided into four even smaller CBs, where each of the smallest CBs is one-eighth of the width and/or height of a root CTB.

A CTB may provide a prediction block (PB) and/or transform block (TB) size (e.g., a maximum possible prediction block and/or a maximum transform block size) that may be used at quantization 206 and/or transform 204, respectively (referring again to FIG. 2). A TB may be recursively sub-divided into smaller sub-TBs, for example, based on a quadtree approach. A corresponding structure, e.g., a residual quadtree (RQT), may allow TB sizes from 4×4 to 32×32 in a Y component.

Figure 5:
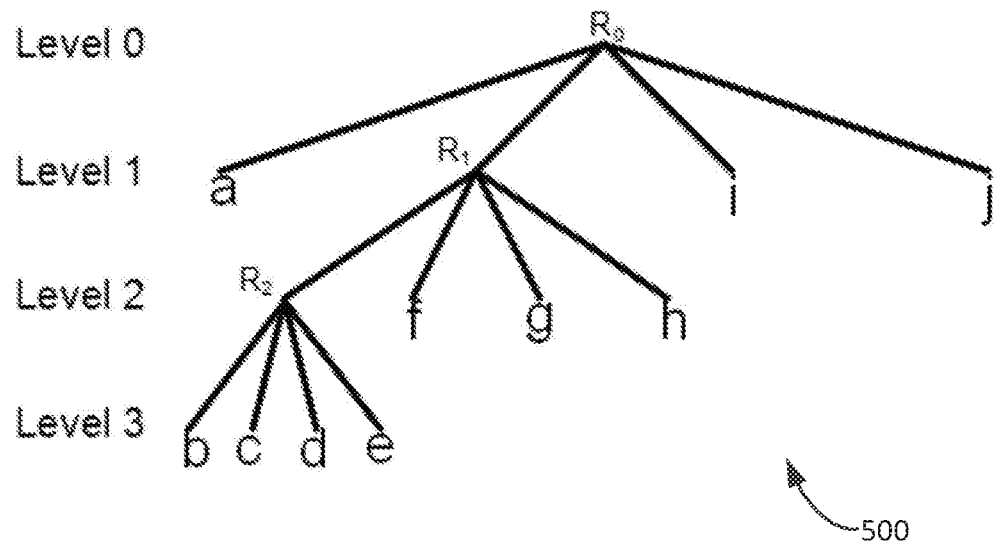
FIG. 5 shows an example quadtree structure.
Figure 5:
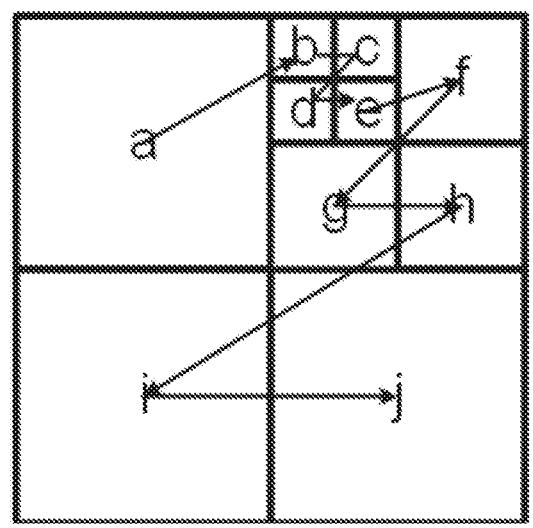

FIG. 5 illustrates example quadtree structure 500. In FIG. 5, a block partition associated with quadtree structure 500 is shown. Exemplary quadtree structure 500 may have four levels as shown in the figure, where level 0 may be related to CTB $R_0$. A CB at level i may have a block size that may be $2^{-i}$ times of a CTB size. A maximum quadtree level may be associated with a minimum possible CB size and/or PB size and/or TB size. Level information may be inferred from quadtree splitting flag of each CTB coded in a bitstream. Given a CTB, a possible CB size may be selected by an encoder. Such a selection may depend on one or more characteristics of input video content.

In a frame, an encoding order of CTBs may be traversed in a raster scan order (e.g., left-to-right, top-to-bottom). In a CTB, CBs may be encoded by a quadtree depth first scan order, which may be referred to as a Z scan order. As shown in diagram 510 of FIG. 5, one or more CBs may be encoded in alphabetical order (e.g., a to j). A decoder may follow the same rule to decode CBs (e.g., in parsing the bitstream).

Sample adaptive offset (SAO) may be implemented in one or more examples. An RQT approach may be used to conduct, e.g., transform 204 of FIG. 2, where a largest transform size may be up to 32×32. In an example, a supported transform size may be no larger than 8×8. A symmetric 8-tap filter may be used for half-sample positions, an asymmetric 7-tap filter may be used for quarter-sample positions, and, for example, in implementations that may conform to H.264/AVC, a 6-tap filter may be used in Y-component interpolation performed at, e.g., motion compensated prediction unit 362 of FIG. 3.

Larger transforms may introduce a ringing artifact that may be caused by quantization errors. Alternatively, or in addition, higher numbers of interpolation taps may result in a similar artifact or one or more other artifacts, for example, around edge boundaries. To address this issue and reduce encoding artifacts, an SAO process may be employed in an in-loop filter unit, such as loop filter unit 266 of FIG. 2. An SAO may reduce the mean distortion of an encoding block (e.g., the basic block of SAO may be a CTU). A current block may be classified into one or more of multiple categories and associated with a classifier. An offset (e.g., a related offset) may be obtained, in some examples for each category of the multiple categories, in an effort to minimize mean sample distortion. An obtained offset may be added to each reconstructed sample of a category. A classifier index and/or one or more associated offsets may be signaled as side information.

An SAO may include one or more sample processing methods (e.g., edge offset (EO) and/or band offset (BO)). For EO, a sample classification may be based on a comparison of current samples and neighboring samples (e.g., in a direction). There may be four edge directions (e.g., horizontal, vertical, 45 degree diagonal, 135 degree diagonal). If an EO mode is chosen, one of the edge patterns (e.g., an edge pattern that appears to be optimal) may he selected and/or an associated pattern index and/or an absolute offset may be encoded in a bitstream. EO may be used to reduce undesired sharp edges, thereby possibly restoring more potentially pleasing details.

In examples that use BO, an input block may be equally divided into one or more bands according to a sample bit depth. For example, if an input sample has an 8-bit depth, data may be split into 32 bands (e.g., a width of a band may be 8). If such a sample "belongs" to band k, a value of such a sample may be within 8k to 8k+7, inclusive, for example where k ranges from 0 to 31. For each such band, an average difference (may be referred to as an "offset") between an original sample and a reconstructed sample may be obtained. Offsets and/or an initial band position of exemplary four consecutive bands may be selected based on rate distortion optimization. Alternatively, or in addition, related side information may be encoded in a bitstream. The signs of offsets in BO may be encoded, in some examples using different encoding from that used in EO.

In SAO examples, there may be one or more level-based syntax elements. For example, there may be three level-based syntax element that may include one or more sequence parameter set (SPS) levels, one or more slice levels, and one or more CTU levels. In an SPS level, a sample_adaptive_offset_enabled_flag (for example) may be used to indicate whether SAO may be enabled in a current video sequence. In a slice level, if, for example, a sample_adaptive_offset_enabled _flag is enabled, two additional flags, such as slice_sao_luma_flag and slice_sao_chroma_flag, may be used to indicate that SAO may be enabled for one or more Y-components and/or one or more Chroma (U/V)-components, respectively. In a CTU level, if a slice_sao_luma_flag, a slice_sao_chroma_flag, or both are enabled, associated SAO parameters may be encoded (e.g., encoded at a beginning of CTU) in a bitstream. SAO parameters may include one or more types of information, such as, for example, SAO merging information, SAO type, and/or offset information. An SAO type may be used to indicate that SAO is off for a CTU.

For SAO merging information, a CTU (e.g., a current CTU) may reuse SAO parameters (e.g., a current CTU may reuse SAO parameters from its neighboring CTU(s) indicated, e.g., by sao_merge_left_flag and/or from its top neighboring CTU indicated by sao_merge_up_flag). SAO merging information may be shared (e.g., shared by three components). If one or more of the two signals is enabled, there may be no more data sent for a current CTU. Otherwise, an SAO type and/or offset information may be explicitly coded in the bitstream.

In an example, to provide SAO type and/or offset information, an SAO type information, in an example in the form of sao_type_idx_luma and/or sao_type_idx_chroma, may be used to indicate 0 for SAO_OFF mode, 1 for BO mode, and/or 2 for EO mode. If SAO_OFF mode is indicated, there may be no more information that may be, or may have been, sent for a current type. Cb and Cr may share a same SAO type. If a BO mode is indicated, values (e.g., absolute values) of offsets, such as those that may be indicated in sao_offset_abs, signs of offsets, such as those that may be indicated in sao_offset_sign, and/or a start band position of offsets, such as those that may be indicated in sao_band_position, may be encoded for each type. If EO mode is indicated, values (e.g., absolute values) of offsets, such as those that may he indicated in sao_offset_abs, may be encoded (e.g., for each type). EO class information, such as that may be indicated in sao_eo_class_luma and/or sao_eo_class_chroma, may be sent for a first two components (e.g., Y and/or Cb). A third component (e.g., Cr) may share EO class information with another component, such as Cb.

Adaptive loop filtering (ALF) may be used in some examples. ALF may improve coding efficiency and/or a quality of reconstructed pictures in a reference picture store (e.g., picture store 264 in FIG. 2 and/or picture store 364 in FIG. 3). ALF may also, or instead, improve coding efficiency and/or a quality of reconstructed pictures in a video output (e.g., video output 320 of FIG. 3). A process order in an in-loop filter (such as loop filter 266 of FIG. 2 and/or loop filter 366 of FIG. 3) may be DF, SAO, and/or ALF (e.g., sequentially, where DF may be processed first, and then SAO) may be processed second, and ALF may be processed third).

ALF may be located at a last stage of a filter, for example, because ALF may be a tool that may fix one or more encoding errors, such as encoding errors that may have been caused by one or more encoding process stages. Because ALF may be placed in the in-loop filtering unit (such as loop filter 266 of FIG. 2 and/or loop filter 366 of FIG. 3), benefits of one or more filtering effects obtained in associated reference pictures may be propagated to encoding processes of subsequent pictures. Region-based filters may be employed and may preserve higher-frequency information, for example, as compared to one frame-based filter (e.g., that may cause over-smoothing in a picture). A block-based on/off filter control flag may be signaled to improve filtering performance locally. Filter coefficients of ALF may be trained adaptively (e.g., trained at an encoder) by minimizing a difference between one or more original samples and one or more current reconstructed samples (e.g., in terms of mean square error). A finite impulse response (FIR) filter may be applied to reconstructed samples. Related filter coefficients may be signaled as side information.

Figure 6:
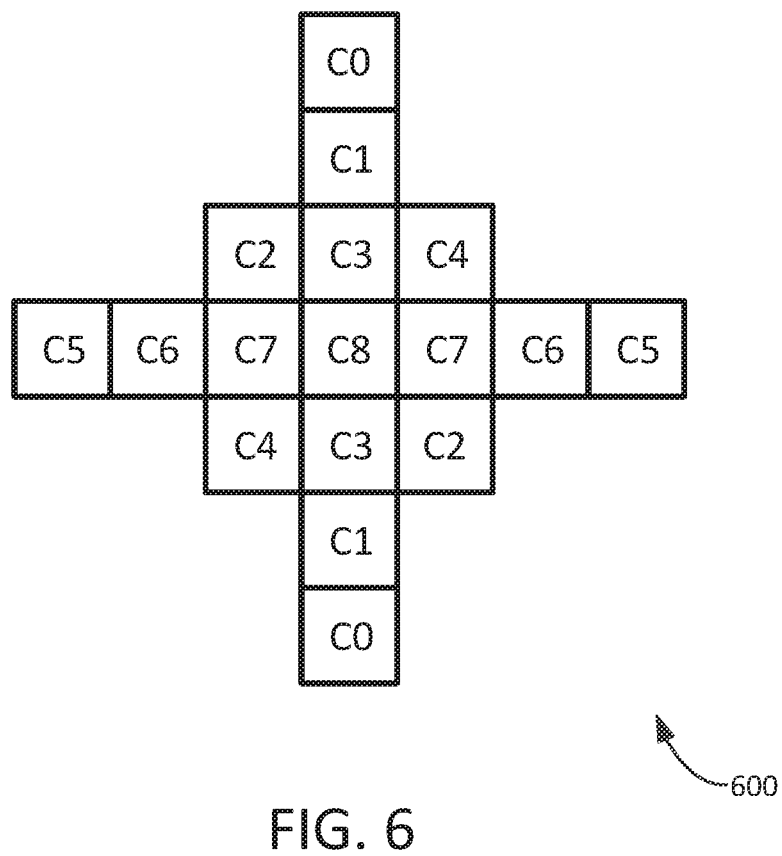
FIG. 6 shows an example filter shape.

In ALF, square shapes may be used (e.g., 5×5, 7×7, and/or 9×9). A filter shape may be selected at a picture level. Diamond shapes (e.g., 5×5, 7×7, and/or 9×9) may be used to reduce filter coefficients (in some examples, half of a number of filter coefficients). ALF examples may use, for example, a combination of a 7×7 cross shape and a 3×3 rectangular shape. As shown in FIG. 6, diagram 600 of a cross shape illustrates that there may be 17 samples that may be used to derive a filtered value for a center. In order to reduce a number of coefficients to be signaled, a symmetry property is applied. For example, for 17 filter positions, only 9 coefficients (e.g., C0, . . . , C8 as shown in FIG. 6) may be used.

A block-based ALF (BALF) method may be implemented that may, for example, improve coding performance. A picture may be divided into blocks (e.g., with the same size and/or signal of indicating whether a current block may have been filtered), A quadtree-based ALF method may be implemented. A block level on/off flag may be determined, for example, in terms of a rate distortion cost. If a determined ALF cost(s) of a parent block is larger than a total ALF cost(s) of the parent block's child sub-blocks, filters for child blocks may be applied, for example, each child sub-block's filter may be used for that child sub-block. Child filters may differ from those used for the parent block or may be a same filter as that used for the parent block. Each child filter may be a different filter from other child filters.

Filter coefficients may be trained and/or signaled. ALF may use a region-based filter adaptation (RA) method to support a local adaptation. For example, in RA, a picture may be split into regions (e.g., multiple non-overlapping equal sized rectangular regions). A region boundary may be CTU boundaries. A filter may be trained and/or applied, e.g., for a region. Such a local adaptation may benefit a picture with structure (e.g., apparent structure) and/or patterns (e.g., repetitive patterns) in regions (e.g., local regions).

Neighboring regions may share similar content. A region merge scheme may be used to reduce signaling overhead associated with filter coefficients. Merge syntax elements may be parsed, for example, to derive mapping information between regions and/or filters. A syntax element may indicate whether a single filter (e.g., associated with one, of three, filter cases) may be used for an entire picture. For example, a syntax element may indicate that one filter, two filters, and/or more than two filters may be used. Where one filter may be used, there may be no merging information sent to a decoder, for example, because regions may share a same filter. Where two filters may be used, a start position of a second filter of the two filters applied may be sent to a decoder. In a two filter case, a working region of a first filter of the two filters may be inferred. Where more than two filters may be used, filter positions may be coded by Differential Pulse-code Modulation (DPCM).

Figure 7:
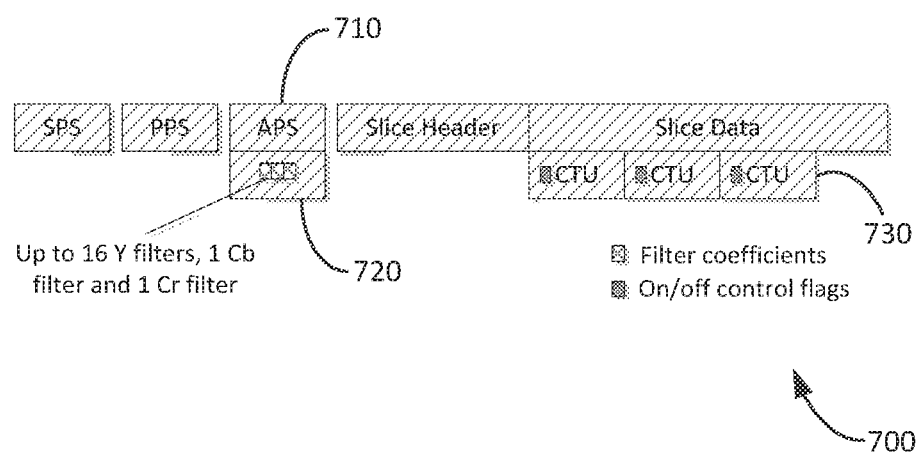
FIG. 7 shows an example adaptive loop filter (ALF) syntax structure.

In ALF, there may be one or more types (e.g., two types) of coded information. Coded information may include one or more filter coefficient parameters, and/or one or more filter on/off control flags. FIG. 7 illustrates exemplary ALF syntax structure 700. In structure 700, filter coefficient parameters may be encapsulated in a parameter set (e.g., a parameter set such as adaptive parameter set (APS) 710). There may be one or more (e.g., up to 16) filters that may be used for a Y-component. For example, one filter may be used for a U-component, one filter may be used for a V-component, and/or up to 16 filters may be used for a Y-component. These filters may be indicated at section 720 of structure 700.

Filter coefficient parameters may include three picture-level on/off control flags, a number of filters for a Y-component, and/or associated filter coefficients, e.g., if a picture level control flag is "on." An APS may have an ID that may differentiate the APS from other APSs. An APS ID may be coded at a slice header, e.g., to indicate an APS to which the slice refers. An APS ID may be used to derive shared information of picture-level filters. There may be one or more (e.g., up to eight) APSs that may each be reused. Filter control flags may include one or both of two filter control flag types, picture-level flags and/or CTU-level flags. Where a picture-level flag may be "on," a CTU-level flag may be encoded and/or parsed (e.g., encoded and/or parsed for a CTU), as shown in section 730 of structure 700. If a picture-level flag is "off," there may be no CTU-level flags that may be sent to a decoder and/or inferred as "off."

Video resolutions such as 720 progressive (720p), 1080 progressive (1080p), and 1080 interlace (1080i) may be referred to as High Definition (HD). Video resolutions such as 4K (3840×2160) and 8K (7680×4320) may be referred to as Ultra HD. As higher resolutions are increasingly used by video applications (e.g., from HD to Ultra HD), efficiently compressing Ultra HD content may facilitate the development of next-generation video coding. High resolution video coding may benefit from a larger prediction block size, transform, and/or quantization of prediction residues. A maximum CTB size may be 64×64.

Video coding may be based on a quadtree structure. CTB may be increased in size to a super-block (e.g., a block having a larger size) for use with Ultra HD video coding. Super-block signaling for a homogeneous area may reduce overhead signaling of a mode of a coding unit, a PU partition type, and/or prediction related information (e.g., intra-prediction mode, motion vector, etc.). A super-block (e.g., a Super Coding Unit (SCU)) may be processed using two or more (e.g., two) coding modes. Two such coding modes may include one or both of a Direct-CTU coding mode and an SCU-to-CTU coding mode. Direct-CTU coding mode may be used for a complex region and. SCU-to-CTU coding mode may be used for a homogenous region in a picture. A coding setting (e.g., a preferred coding setting) applied to a super-block may be chosen from available coding modes (e.g., the two coding modes Direct-CTU and SCU-to-CTU).

Where a CTB may be extended to a super-block, a basic block unit processed by ALF may be extended to a same size a same size according to an existing syntax structure of ALF). CU level filter on/off control may be provided, used, and/or signaled. For example, CU level based ALF for filtering a super-block may be provided, where one or more (e.g., three) types of on/off control flags may be included in a bitstream. Such flags may include one or more of, for example, a slice level flag, a super-block level flag, and a CU level flag. CU level filtering may be conducted and/or an associated flag may be signaled for a decoder, for example, where a slice level flag and/or a super-block level flag may be set to "on."

When a slice level flag, a super-block level flag, and/or a CU level flag within a super-block simultaneously indicate "on", CUs in a current super-block may be filtered. This may result in a larger number of overhead bits. A CU level based ALF method may be implemented, for example, where an additional super-block level flag may be used to indicate whether CU flags in a current super-block are "on" and/or "off." If such an additional super-block level flag is "on," no CU level flag may be signaled and/or a decoder may infer that ALF is applied for CUs within the super-block. If the additional super-block flag is "off," CU level on/off flags may be encoded (e.g., explicitly encoded) to indicate to a decoder that ALF filtering may be applied for a CU.

SAO and/or ALF may be employed in a cascaded way, for example, to improve reconstructed picture quality in an in-loop filtering process. A processing order of SAO and/or ALF may produce different coding performances. For example, SAO followed by ALF may perform better than ALF followed by SAO. A processing order of SAO followed by ALF may be referred to as "SAO-ALF," while a processing order of ALF followed by SAO may be referred to as "ALF-SAO."

The processes of SAO may be dependent on ALF, and vice-versa, for example, because SAO and/or ALF may be cascaded, e.g., where an output of a first processed of these processes may be an input for a second processed of these processes. For example, a process of SAO may be dependent on a process of ALF where ALF may be processed first according to a processing order. Likewise, a process of ALF may be dependent on a process of SAO where SAO may be processed first according to a processing order.

Parameter estimation for a first process in a processing order (e.g., SAO or ALF) may be independent from parameter estimation for a second process in the processing order (e.g., SAO or ALF) at an encoder. Such a configuration may not be a joint parameter estimation performed for bath processes. Parameter estimation for each of two processes may be performed such that interactions between the two processes may be reduced. For example, where performance of an SAO-ALF process may be better than performance of an ALF-SAO process, a disjoint configuration of an SAO-ALF process may be used, where samples filtered by a first filtering process (e.g., SAO) may not be used in a subsequent second filtering process (e.g., ALF).

SAO may be processed based on CTUs. A basic block (e.g., an SAO block) that may be filtered by SAO may be an SCU in super-block video coding. As a size of a processing unit increases, coding efficiency of SAO may be affected. SAO may be provided with a configurable size. A size of an SAO block may not be equal to that of an SCU. An SAO block may be independent from an SCU. Flexibility of SAO blocks may improve performance of a traditional SAO filter in video coding with large resolutions.

A coding block structure of an input video signal, an adaptive loop filter, and/or a sample adaptive offset are disclosed. A basic video block size for processing may he extended to a super-block SCU for use in video coding in large resolutions, such as ultra HD. At least two separate coding structures may be used to encode a super-block, e.g., using Direct-CTU and/or SCU-to-CTU modes. ALF and/or SAO systems and methods for super-block-based video coding are also disclosed herein. Note that, herein, "super-block" and "SCU" may be used interchangeably.

Figure 8:
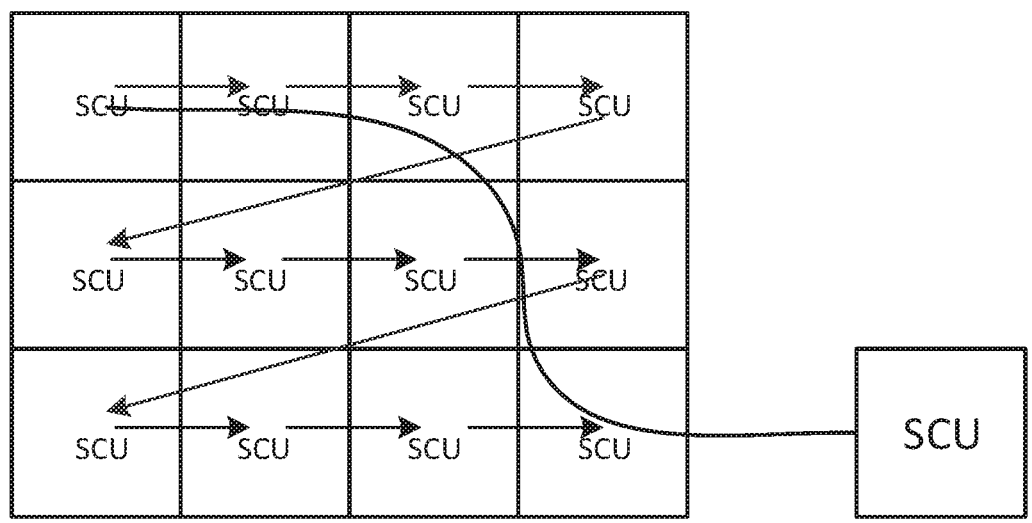
FIG. 8 shows a diagram of an example super-coding unit (SCU) configuration.

At least two separate coding structures (e.g., Direct-CTU and SCU-to-CTU modes) may be used to encode a super-block. In Direct-CTU mode, an SCU may split into a number of predefined CTUs. Encoding parameters (e.g., preferred encoding parameters may be determined from a current CTU to determine a minimum coding unit (MCU). In SCU-to-CTU examples, encoding parameters (e.g., preferred encoding parameters) may be determined from SCU to CTU. A size of a CTU may be configurable. For example, a size of a CTU may be 64×64. A coding mode (e.g., a preferred coding mode) for a super-block may be selected from available modes (e.g., Direct-CTU mode and SCU-to-CTU mode) based on an overall rate-distortion cost of the super-block. In an example,. Direct-CTU mode and/or SCU-to-CTU mode may be associated with one or more syntax changes, In an exemplary Direct-CTU mode, an input video frame first be divided into SCUs. An SCU may be a block (e.g., a rectangular block, a square block, a diamond shaped block, etc.) where one or more of the SCUs may have a size equal to that of other SCUs and/or may be encoded in a raster scan order within a single frame. FIG. 8 shows exemplary, nonlimiting SCU configuration 800. One or more (e.g., 12 as shown in configuration 800) SCUs may be included in one frame. One or more Direct-CTU and/or SCU-to-CTU methods may he performed to determine encoding parameters (e.g., preferred encoding parameters) such one or more of a coding mode, a prediction mode, a motion vector, a quantized transform coefficient, etc.

In Direct-CTU mode, an input SCU may be divided (e.g., directly divided) into CTUs, in an example into CTUs that may have equal sizes. $M_{SCU}$, $M_{CTU}$ and/or $M_{MCU}$ may represent a size of an SCU, a CTU, and an MCU, respectively. There may be one or more e.g., four configurable parameters that may be used to represent relationships among such parameters. For example, configurable parameters that may be used to represent such relationships may include one or more of MaxSCUWidth that may specify a maximum width of a super-block, MaxSCUHeight that may specify a maximum height of a super-block, MaxPartitionDepth that may specify a depth of an MCU relative to an SCU in a quadtree structure, and/or MaxDirectPartitionDepth that may specify a depth of a CTU relative to an SCU in a quadtree structure.

Note that, in a nonlimiting example, and as used herein, $M_{SCU}$=MaxSCUWidth or MaxSCUHeight, $M_{CTU}=2^{Log_2(M_{SCU})-MaxDirectPartitionDepth}$, and $M_{MCU}=2^{Log_2(M_{SCU})-MaxPartitionDepth}$.

MaxPartitionDepth and/or MaxDirectPartitionDepth may be set as nonnegative integer values, including 0. MaxPartitionDepth may be equal to 0, which may indicate that there may be no partition for an SCU. MaxDirectPartitionDepth may be no greater than MaxPartitionDepth, which may indicate that a size of a CTU may always be no smaller than a size of an MCU. When MaxPartitionDepth and MaxDirectPartitionDepth may be configured with a same value, Direct-CTU mode may be degraded to a SCU-to-CTU mode. For example, a Direct-CTU process may be processed while a SCU-to-CTU process may be bypassed.

Figure 9:
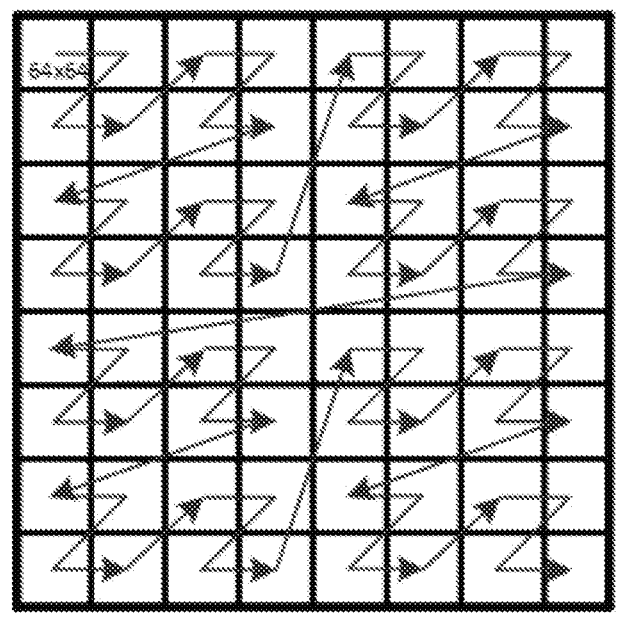
FIG. 9 shows a diagram of an example encoding order.

Encoding order diagram 900 shown in FIG. 9 illustrates an exemplary Direct-CTU mode encoding order for a number of CTUs shown in diagram 900, where an order may be indicated by the arrows shown in diagram 900. A super-block size may be 512×512 ($M_{SCU}$=512) and a size of a CTU may be 64×64 ($M_{CTU}$=64). One or more CTUs may be encoded using a Z scan order in a super-block, where such a super-block may belong to a depth-first search (DFS). A DFS may facilitate a higher coding efficiency (e.g., a higher coding efficiency as compared to a raster scanning order). Left and/or top neighboring CTUs, as represented in diagram 900, may be encoded and/or transmitted before a current block. A context-adaptive binary arithmetic coding (CABAC) context may more efficiently be used in a Z order than in a raster order. Encoded neighboring CTUs may be used to facilitate encoding of a current block (e.g., for motion vector prediction and/or context modeling in entropy coding). In Direct-CTU mode, each CTU may be encoded and/or a possible minimum block size may be $M_{MCU}=2^{Log_2(M_{SCU})-MaxPartitionDepth}$.

In SCU-to-CTU mode, an SCU may be divided into CUs (e.g., into CUs having varying sizes) by a recursive quadtree partition. A minimum possible CU size in SCU-to-CTU mode may be $M_{CTU}$, where MaxDirectPartitionDepth may be used as an early termination mechanism (e.g., preconfigured). Encoding for testing potential CU partitions (e.g., from SCU to MCU) may be complex because, for example, a size of an SCU may increase. The computational complexity of employing super-blocks, e.g., for Ultra HD videos, may be resource intensive, for example, when testing all possible CU partitions (e.g., from an SCU to an MCU).

Direct-CTU mode may be used for a complex region in which small CUs may be selected (e.g., commonly selected) for a higher video quality, while SCU-to-CTU mode may be used for a homogenous region where large CUs may be selected (e.g., commonly selected), which may provide improved coding efficiency. Direct-CTU mode and SCU-to-CTU mode used in combination may facilitate the use of super-blocks in Ultra HD video coding. A minimal CU size in SCU-to-CTU mode may be equal to a CTU size. A maximum depth in SCU-to-CTU mode may be signaled separately and may be different than MaxDirectPartitionDepth.

Figure 10:
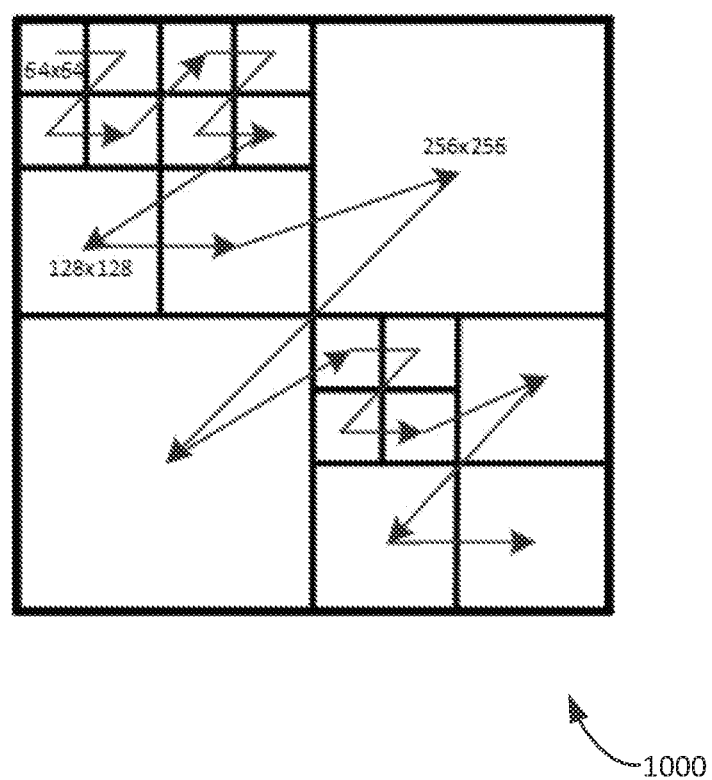
FIG. 10 shows another diagram of an example encoding order.

Encoding order diagram 1000 shown in FIG. 10 illustrates an exemplary SCU-to-CTU mode encoding order for a number of CTUs as shown in diagram 1000. A current super-block may be 512×512 ($M_{SCU}$=512) while a minimal CU size may be 64×64 ($M_{CTU}$=64). In SCU-to-CTU mode, a CU may be encoded, for example, according to a current HEVC scheme.

Exemplary semantics of syntax elements for each of two coding modes (e.g., Direct-CTU coding mode and SCU-to-CTU coding mode) that may be used to encode a super-block are set forth herein. A super-block may choose a preferred coding mode, e.g., from among Direct-CTU coding mode and SCU-to-CTU coding mode. Note that additional coding modes are also contemplated as within the scope of the instant disclosure. A preferred mode may be referred to as a decoding mode or an encoding mode (e.g., depending on whether the mode may be used at a decoder or an encoder, respectively).

An encoder may transmit a signal indicating a selected mode, where the signal may include an indicator or flag that indicates a decoding mode or encoding mode. A flag or indicator (e.g., a flag or indicator that may be labeled super_block_coding_mode) may be used to indicate the selected mode. In an example, where super_block_coding_mode may be equal to 0, a super_block_coding_mode may indicate that Direct-CTU mode may be used for a current super-block coding. Where super-block_coding_mode may be equal to 1, a super_block_coding_mode may indicate that SCU-to-CTU mode may be used for a current super-block coding. A flag or indicator that may indicate a mode may indicate more than one mode, for example, indicating that both SCU-to-CTU mode and Direct-CTU mode may be used for super-block coding. A table illustrating exemplary syntax for coding mode indications is shown below in Table 1.

TABLE 1

Exemplary Coding Indication Syntax

| coding_tree_unit( ) { | Descriptor |
|---|---|
|   super_block_coding_mode | ae(v) |
|   xCtb = ( CtbAddrInRs % PicWidthInCtbsY ) << CtbLog2SizeY | |
|   yCtb = ( CtbAddrInRs / PicWidthInCtbsY ) << CtbLog2SizeY | |
|   if( slice_sao_luma_flag \|\| slice_sao_chroma_flag ) | |
|     sao( xCtb >> CtbLog2SizeY, yCtb >> CtbLog2SizeY ) | |
|   coding_quadtree( xCtb, yCtb, CtbLog2SizeY, 0 ) | |
| } | |

The syntax described herein may use a coding_tree_unit structure from existing video coding specifications and/or standards, for example, to indicate a largest block unit permitted in a coding process. Any disclosed syntax and structure may be replaced and/or renamed to be used with any other super-block structure, and all such embodiments are contemplated as within the scope of the instant specification. For example, coding_tree_unit( ) may be replaced with an equivalent or similar syntax element, such as super_coding_unit( )

A flag (e.g., a flag that may be labeled split_cu_flag) may be used to indicate whether a current CU is split. In an example, when split_cu_flag may be equal to 0, split_cu_flag may indicate that a CU is not split. Additionally, or instead, when split cu flag may be equal to 1, split_cu_flag may indicate that a CU may be split into sub-CUs (e.g. four sub-CUs) where a portion of such sub-CUs (e.g., half of such sub-CUs) may be horizontal in size and another portion of such sub-CUs (e.g., the remaining half of such sub-CUs that are not horizontal in size) may be vertical in size.

Sending a split_cu_flag flag in a Direct-CTU mode may be avoided. For example, where superblock_coding_mode may be equal to 0, superblock_coding_mode may indicate that a Direct-CTU mode is picked. If a current CU size is larger than $M_{CTU}$, a split_cu_flag may not be sent. Split_cu_flag being set to 1 may be indicate, e.g., that there may be further partitions. A flag may be saved, for example, because $M_{CTU}$ may be a maximum CU size allowed in a Direct-CTU mode. A decoder may derive a value of a split_cu_flag when a current CU size is larger than $M_{CTU}$. A table illustrating exemplary syntax for coding mode indications is shown below in Table 2.

TABLE 2

Exemplary Coding Indication Syntax

| coding_quadtree( x0, y0, log2CbSize, cqtDepth ) { | Descriptor |
|---|---|
|   if( x0 + ( 1 << log2CbSize) <= pic_width_in_luma_samples && y0 + ( 1 << log2CbSize ) <= pic_height_in_luma_samples && log2CbSize > MinCbLog2SizeY ){ | |
|     if( (!super_block_coding_mode && log2CbSize <= Log2SizeCTU) \|\| (super_block_coding_mode && log2CbSize > Log2SizeCTU) ) | |
|       split_cu_flag[ x0 ][ y0 ] | ae(v) |
|   } | |
|   if( cu_qp_delta_enabled_flag && log2CbSize >= Log2MinCuQpDeltaSize ) { | |
|     IsCuQpDeltaCoded = 0 | |
|     CuQpDeltaVal = 0 | |
|   } | |
| ... | |
| } | |

Coding performance of ALF may be improved when an input video resolution increases. Use of ALF may facilitate video coding, from a coding efficiency perspective, when there are large resolutions in a video stream. As a super-block coding structure is applied, CTB-level ALF may be extended to super-block level ALF.

Filtering control may be performed at a CU level. A CU level ALF signaling method and/or system may improve coding efficiency.

CTU may be extended to a super-block and a CTU level ALF may be extended (e.g., extended to a same size of an extended CTU super-block). Such examples may use syntax structures of ALF as set forth herein. A block-level adaptive ALF control flag may be signaled. A CU-level ALF on/off control flag may be set based on potential rate distortion costs associated with whether to apply ALF on the CU.

Where a rate-distortion cost associated with ALF applied is less than a rate-distortion cost without ALF applied (e.g., in a current CU), a CU-level control flag may be set to "1" to indicate, for example, that ALF may have been applied. Alternatively, or instead, a CU-level ALF flag may be set to "0" to indicate, for example, that ALF has not been applied. Use of such CU-level flags may facilitate the reduction of the impact of inaccurate filtering problem on super-blocks and/or a latency of a decoder, for example, because CUs with ALF off flags in a current super-block may not be filtered.

Figure 11:
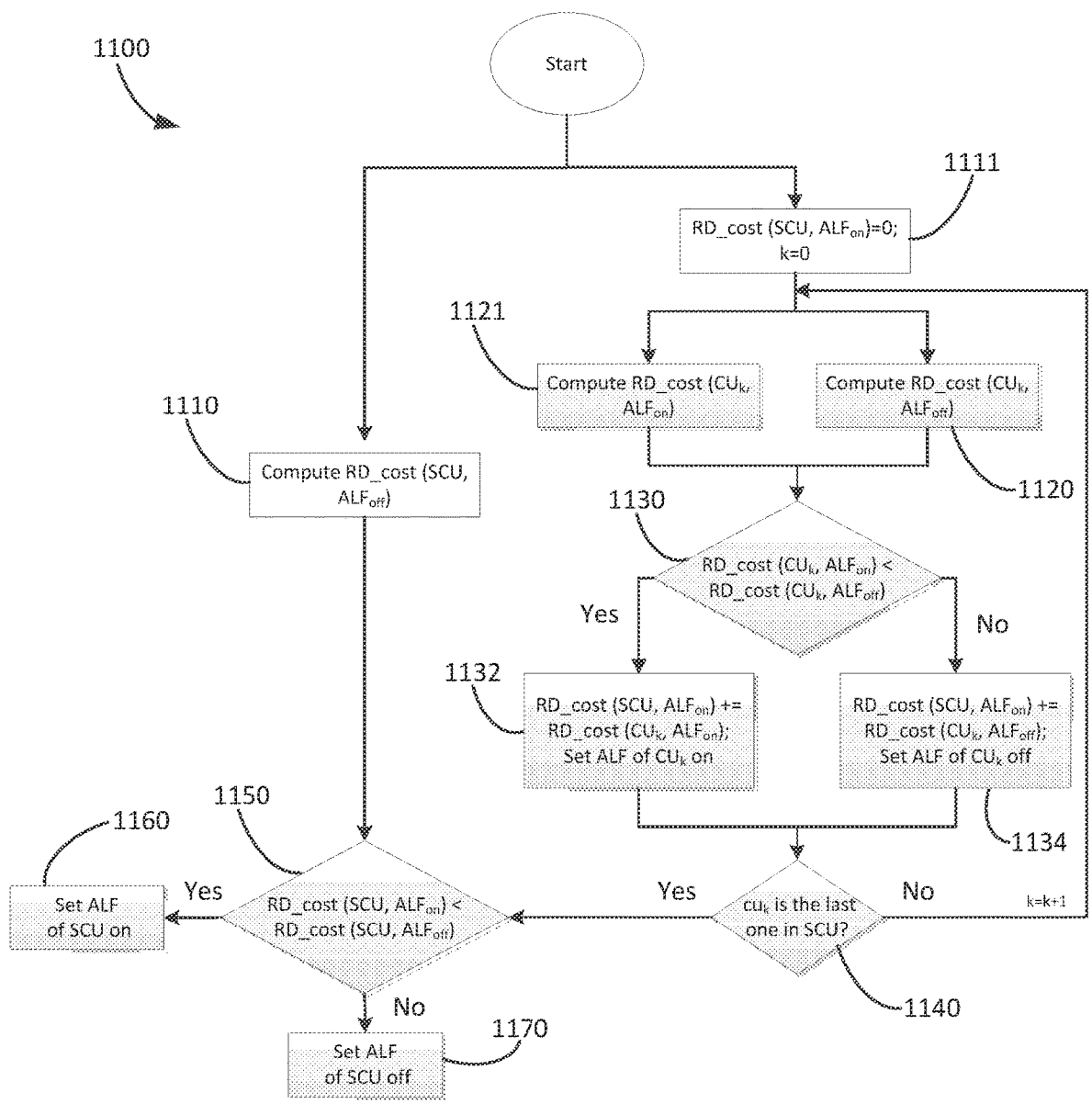
FIG. 11 shows an example method of determining a coding unit (CU) level flag.

FIG. 11 shows a flowchart illustrating exemplary method 1100 of determining a CU-level ALF control flag. At block 1120, rate-distortion costs of ALF "off" for a CU may be computed. At block 1121, rate-distortion costs of ALF "on" for a CU may be computed.

The lesser cost between rate-distortion costs of having ALF "on" and having ALF "off" at a CU level may be determined for a current CU at block 1130. The summation of such costs may be obtained at blocks 1132 and 1134 for each scenario (e.g., where rate-distortion costs of having ALF "on" are more than rate-distortion costs of having ALF "off", and vice-versa). A determination may be made at block 1140 of whether an evaluated CU is a last CU in an SCU.

At block 1110, rate-distortion costs of ALF "off" for an SCU may be computed. At block 1111, rate-distortion costs of ALF "on" for an SCU may be initialized, for example, as "0."

The lesser cost between rate-distortion costs of having ALF "on" and having ALF "off" at an SCU level may be determined for a current SCU at block 1150, e.g., after determining that the current CU is the last CU in an SCU at block 1140. Associated mode information may be coded. When an "off" ALF mode may be selected, such as when it is determined at block 1150 that rate-distortion costs of ALF "off" for an SCU are less than rate-distortion costs of ALF "on" for an SCU, SCU-level flags may be coded at block 1170 indicating such a selection (e.g., ALF is "off") as side information. When an "on" ALF mode may be selected, such as when it is determined at block 1150 that rate-distortion costs of ALF "on" for an SCU are less than rate-distortion costs of ALF "off" for an SCU, SCU-level flags may be coded at block 1160 indicating such a selection (e.g., ALF is "on") as side information.

Table 3 shown below illustrates an exemplary relationship between a super-block level flag and a CU level flag. For example, if a super-block level ALF flag may be 0, there may be no CU level flag signaled and/or a decoder may infer it as 0. Alternatively, if a super-block level ALF flag is 1, associated CU level flags may be sent.

TABLE 3

Exemplary CU-level ALF Flag Status

| super_block level ALF flagging | CU level ALF flagging (0: off, 1: on) |
|---|---|
| 0 | inferred as 0 |
| 1 | signaled |

Figures 12, 13:
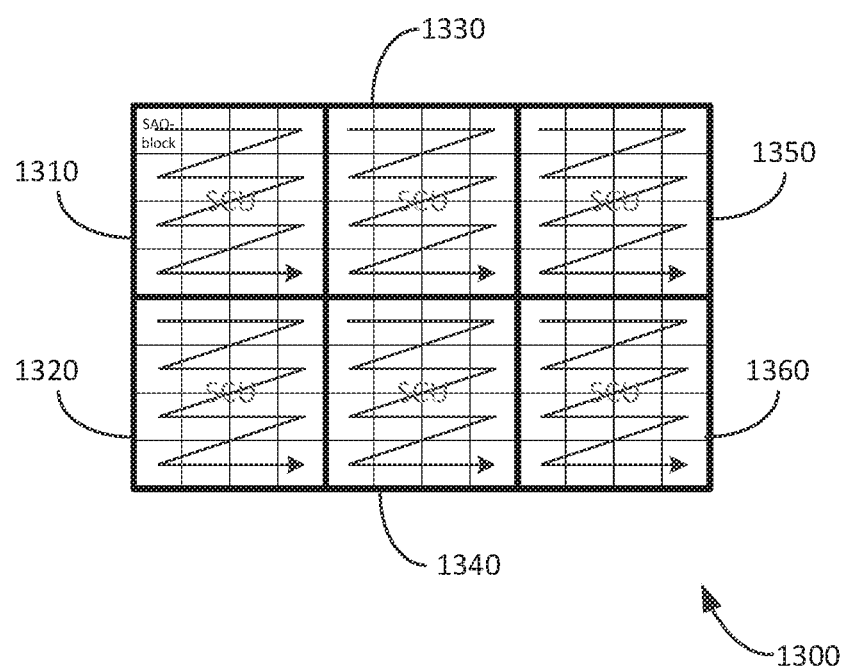
FIG. 12 shows a diagram of an example super-block.
FIG. 13 shows a diagram of an example block structure.

FIG. 12 shows a diagram of exemplary super-block 1200 and demonstrates an example of CU-level ALF flagging. In super-block 1200, a maximum filtered CU may be 256×256 and/or a minimum filtered CU size may be 64×64. CUs with control flags equal to 1 may be filtered by ALF while CUs with control flags equal to 0 may not be filtered. Where a traditional ALF method may be used (e.g., super-block level-based ALF) and a current block size filtered by ALF may be 512×512.

CU-level ALF as described herein may be used to reduce overhead that may be experienced by known CU-level ALF implementations. For example, Table 3 above illustrates an example where both super-block-level flags and/or CU-level flags may be 1. If an SCU is split in deep depth, it may cost a significant number of bits to signal flags that may be equal to 1. In an example, to avoid this situation, a super-block level flag may be used to indicate whether CUs may be filtered. Relationships among ALF flags in such examples are shown in Table 4 below.

TABLE 4

Exemplary CU-level ALF Flag Statuses

| super-block level flagging | CU-level ALF flagging | |
|---|---|---|
| | All CU filtered flagging | CU level flag (0: off, 1: on) |
| 0 | inferred as 0 | inferred as 0 |
| 1 | 1 | inferred as 1 |
| | 0 | signaled |

As illustrated in Table 4, in an example, if a super-block level flag may be 1, there may be no CU level flag coded and/or a decoder may derive and/or set CU-level flags that may be equal to 1. If such a super-block level flag is 0, CU-level flags may be coded as side information.

Semantics of exemplary syntax elements as set forth herein may be used to implement disclosed examples. A CU level-based ALF for a super-block coding structure may be used. For example, when a CU level flag is enabled, a cu_alf_flag flag may be used to specify whether a current CU may be filtered by ALF. An all_cu_alf_filtered_flag flag in a super-block level may be used and may reduce or eliminate overhead bits associated with CU level flag signaling. Other exemplary semantics include:

super_block_alf_flag: may be equal to 0 and, if equal to 0, may specify that a current super-block may not be filtered by ALF;

super_block_alf_flag: may be equal to 1 and, if equal to 1, may specify that a current super-block may be filtered by ALF;

all_cu_alf_filtered_flag: may be equal to 0 and, if equal to 0, may specify that not all CUs may be filtered by ALF in a current super-block;

all_cu_alf_filtered_flag: may be equal to 1 and, if equal to 1, may specify that CUs may be filtered by ALF in a current super-block;

cu_alf_flag: may be equal to 0 and, if equal to 0, may specify that a current CU may not be filtered by ALF; and cu_alf_flag: may be equal to 1 and, if equal to 1, may specify that a current CU may be filtered by ALF.

Tables 5 and 6 shown below set forth nonlimiting examples of coding tree unit syntax and coding unit syntax, respectively. Table 5 shows a detailed coding tree unit syntax that may, for example, be used in HEVC examples. Table 6 shows a simplified coding unit syntax that also may, for example, be used in HEVC examples. Any other syntax elements that may be used in a coding unit and that are not shown in these tables are, regardless, contemplated by the instant disclosure.

TABLE 5

Exemplary Coding Tree Unit Syntax

| coding_tree_unit( ) { | Descriptor |
|---|---|
|   super_block_coding_mode | ae(v) |
|   super_block_alf_flag | ae(v) |
|   if(super_block_alf_flag) | |
|     all_cu_alf_filtered_flag | ae(v) |
|   xCtb = ( CtbAddrInRs % PicWidthInCtbsY ) << CtbLog2SizeY | |
|   yCtb = ( CtbAddrInRs / PicWidthInCtbsY ) << CtbLog2SizeY | |
|   if( slice_sao_luma_flag \|\| slice_sao_chroma_flag ) | |
|     sao( xCtb >> CtbLog2SizeY, yCtb >> CtbLog2SizeY ) | |
|   coding_quadtree( xCtb, yCtb, CtbLog2SizeY, 0 ) | |
| } | |

TABLE 6

Exemplary Coding Unit Syntax

| coding_unit( x0, y0, log2CbSize ) { | Descriptor |
|---|---|
|   if(super_block_alf_flag && !all_cu_alf_filtered_flag) | |
|     cu_alf_flag | ae(v) |
|   if( transquant_bypass_enabled_flag ) | |
|     cu_transquant_bypass_flag | ae(v) |
|   if ( slice_type != I ) | |

TABLE 6-continued

Exemplary Coding Unit Syntax

| coding_unit( x0, y0, log2CbSize ) { | Descriptor |
|---|---|
|     cu_skip_flag[ x0 ][ y0 ] | ae(v) |
|     nCbS = ( 1 << log2CbSize ) | |
|     ... | |
| } | |

Motion compensated prediction using ALF may be used in an example. ALF may be applied to a prediction signal, for example, in an effort to improve inter- and/or intra-prediction efficiency. For example, ALF may be applied to inter-prediction. Given prediction unit PU(x, y)) associated with motion MV(dx, dy), referring to a reference picture indicated by ref_pic_idx, there may be steps that may be performed to obtain a filtered inter-prediction. In an example, obtaining a filtered inter-prediction may performed in two steps.

In an exemplary first step, motion compensation may be applied (e.g., to get an intermediate inter-prediction with extended PU size), in an example, applied as follows:

$$\text{pred\_ext} = MC(\text{ref\_pic\_idx}, x\text{-ext\_}x, y\text{-ext\_}y, \text{size\_}x + \text{ext\_}x*2, \text{size\_}y + \text{ext\_}y*2) \quad (1)$$

where size_x and size_y may be a width and/or a height of a PU and (x, y) may be a top left position of a PU, ext_x and ext_y may be a padding size in a horizontal and a vertical direction, respectively. Such a padding size may be half of a filter size. A padding size may be calculated as follows:

$$\text{ext\_}x = \text{filter size\_}x/2 \quad (2)$$

$$\text{ext\_}y = \text{filter size\_}y/2 \quad (3)$$

where filter_size_x and filter_size_y may be a filter size in a horizontal and a vertical direction, respectively. An intermediate inter-predictive block may be padded in a left, a right, a top, and/or a bottom boundary. Such padded samples may be used for filtering.

In an exemplary second step of a process for obtaining a filtered inter-prediction, an adaptive loop filter may be applied to an intermediate prediction block that may have an extended size, for example, to obtain a filtered prediction block (e.g., a final filtered prediction block).

$$\text{fltPred}(PU(x,y)) = \text{filter}(\text{pred\_ext}) = \sum_{j=0}^{\text{filter\_size\_}y-1} \sum_{i=0}^{\text{filter\_size\_}x-1} \text{pred\_ext}(x - \text{filter}_{13} \text{size\_}x/2 + i, y - \text{filter\_size\_}y/2 + j) * (i, j) \quad (4)$$

A filtered prediction block (e.g., a final filtered prediction block) may be used as an inter-prediction for inter-mode coding. A filter may remove some coding artifacts in a reconstructed reference picture, for example, in an effort to minimize a difference between a prediction and an original signal.

A disjoint configuration of SAO and ALF may be used, for example, to improve coding efficiency. ALF may be used for relatively large resolution video compression. Coding efficiency of ALF may be improved, for example, due to a correlation of source data. In an example, SAO and ALF may be employed selectively to improve coding efficiency in Ultra HD video coding.

When SAO and ALF are both enabled, ALF may affect SAO. For example, an SAO filtered pixel may be subsequently filtered by ALF (e.g., filtered by ALF if SAO is processed first and followed by ALF processing). Encoding orders of SAO and ALF may produce different results, which may demonstrate that processes of SAO and ALF may not be independent. For example, coding performance of SAO-ALF may be better than that of ALF-SAO, or vice-versa. A disjoint design in an SAO-ALF process may be used and may address this performance deficit.

Benefits of SAO may be retained in processing of ALF. Samples filtered by SAO may not be used in training ALF filter coefficients and/or may not be filtered. Samples in a ring artifact area (e.g., samples in a ring artifact area that may be or may have been restored by SAO) may not be filtered by ALF. High-frequency information may be kept in an ALF. The complexity of ALF may be reduced, for example, where a number of samples used in training and/or filtering may be reduced.

A size of an SAO block may be the same as that of a size of a CTU. Alternatively, or in addition, a size of an SAO block may vary and may be adaptive. Signaling of SAO parameters may occur at a CTU level. If an SAO filter may be enabled in a current slice, associated parameters may be placed at a beginning of a CTU in a bitstream. Such parameters may indicate one or more of merge information, type information, and offset information. Any other indications are contemplated by the instant disclosure. An SAO block may be an SCU in super-block video coding.

An SAO may be applied to a SAO block that may be independent of a CTU and/or an SCU. Systems and methods using an adaptive SAO block may be used to provide a flexibility of SAO blocks that may improve the performance of fixed SAO block methods that may be used in Ultra HD video coding.

Either, or both, of an SCU and/or a CTU may include one or more SAO blocks. Each sample within an SAO block may belong to a same SCU and/or a same CTU. Each SAO block may have an associated SAO method (e.g., a traditional SAO method) that may be applied. For example, and referring now to FIG. 13 illustrating frame structure 1300, there may be one or more SCUs in a frame (e.g., SCUs 1310, 1320, 1330, 1340, 1350, and 1360 of frame 1300, as shown in FIG. 13). For each SCU, there may be one or more SAO blocks (e.g., 16 SAO blocks per SCU, as illustrated in FIG. 13). In an SCU, an order of an SAO process may follow a raster scanning order, as illustrated in FIG. 13 by arrows within each SCU.

Set forth herein are a variety of exemplary, nonlimiting semantics and syntax methods and systems that may be used to implement disclosed examples that, e.g., use a fixed SAO block size. Also set forth herein are a variety of exemplary, nonlimiting semantics and syntax methods and systems that may be used to implement disclosed examples that, e.g., use a flexible SAO block size.

A flexible SAO block method may facilitate an SAO filter, such as a traditional SAO filter, in performing Ultra HD video coding. One or more parse processes for each level of an SPS level and/or a slice level may be unchanged, for example, because information may not be added in an SPS level and/or a slice level. A number of SAO blocks in an SCU may be configurable using the disclosed syntax or any other syntax, established or new, and may be changed based on a number of SAO blocks in an SCU. For example, a size of SAO blocks and/or a number of such blocks per SCU may be signaled.

An exemplary syntax table is shown in Table 7, where num_of_sao_blk may be a total number of SAO blocks within an SCU. A value of num_of_sao_blk may be based on a size of an SAO block and/or a size of an SCU.

TABLE 7

Exemplary Coding Unit Syntax

| coding_tree_unit( ) { | Descriptor |
|---|---|
|   super_block_coding_mode | ae(v) |
|   xCtb = ( CtbAddrInRs % PicWidthInCtbsY ) << CtbLog2SizeY | |
|   yCtb = ( CtbAddrInRs / PicWidthInCtbsY ) << CtbLog2SizeY | |
|   if( slice_sao_luma_flag || slice_sao_chroma_flag ) | |
|     for(saoblk=0; saoblk<num_of_sao_blk;saoblk++) | |
|       sao( xCtb >> CtbLog2SizeY, yCtb >> CtbLog2SizeY ) | |
|   coding_quadtree( xCtb, yCtb, CtbLog2SizeY, 0) | |
| } | |

An SAO block size may be signaled in a sequence parameter set (SPS) A number of syntax elements that may be used in an SPS are shown in Table 8 below.

TABLE 8

Exemplary Sequence Parameter Set Syntax

| seq_parameter_set_rbsp( ) { | Descriptor |
|---|---|
| ... | |
|   amp_enabled_flag | u(1) |
|   sample_adaptive_offset_enabled_flag | u(1) |
|   if(sample_adaptive_offset_enabled_flag){ | |
|     log2_sao_block_size_minus3 | ue(v) |
|   } | |
| ... | |
| } | |

The semantic of log2_sao_block_size_minus3 may be labeled as log2_sao_block_size_minus3 plus 3 and may specify an SAO block size.

An adaptive SAO method and/or system may use a variable block size. Basic block sizes processed by SAO may be adaptively determined, for example, based on an overall rate distortion cost for a current SCU. One or more (e.g., two) SAO block sizes (e.g., different SAO block sizes) may be used. One block size may be an SCU while another block size may be a predefined SAO block size.

Figure 14:
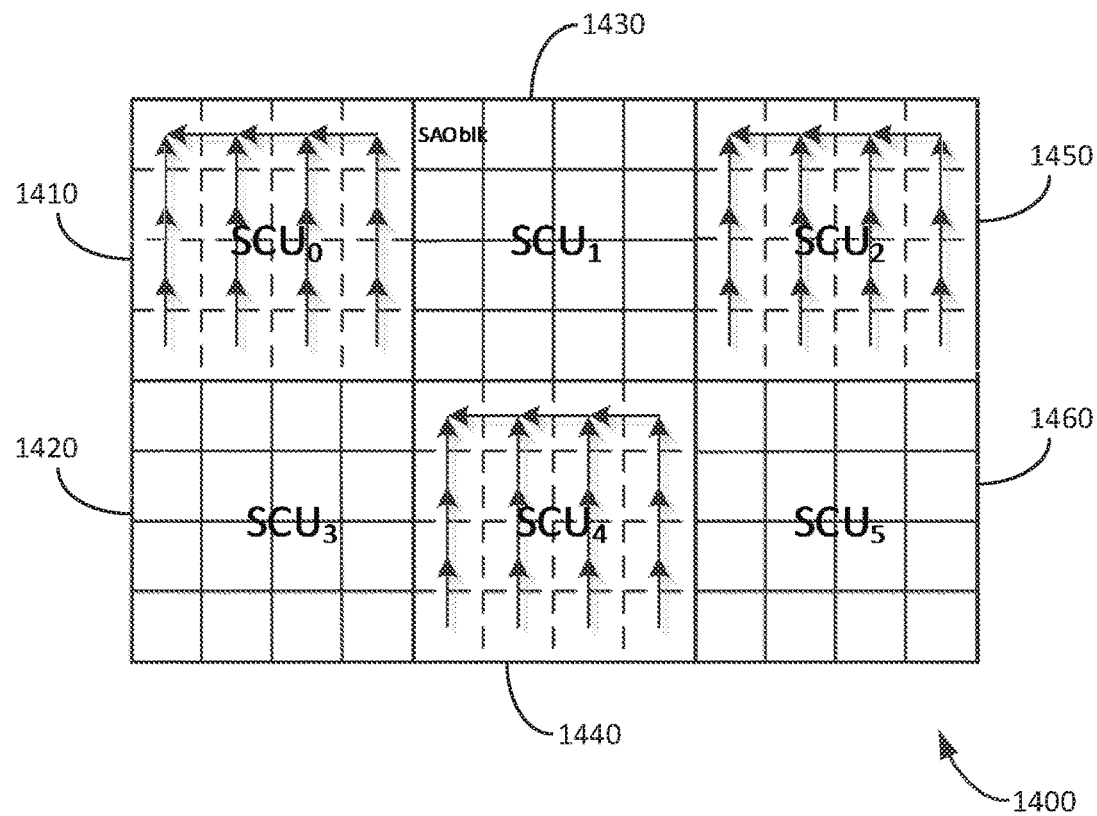
FIG. 14 shows a diagram of example processing units.

An adaptive SAO method and/or system may use an SAO block as a basic storage unit, where a size of an SAO block may be no larger than that of SCU. FIG. 14 shows diagram 1400 illustrating exemplary blocks that may be used in an adaptive SAO method and/or system. A super-block (e.g., shown as blocks having dashed lines, i.e., blocks 1410, 1440, 1450) may indicate that an SAO size may be equal to an SCU. Parameters for a current SAO processing unit may be stored, for example, in SAO block 1410. Remaining SAO blocks 1440 and 1450 may use a merge mode where a direction is represented by an arrow in FIG. 14, as shown in blocks 1410, 1440, and 1450.

Super-blocks such as blocks 1420, 1430, and 1460 shown in FIG. 14 may indicate that an SAO size may be equal to that of a predefined. SAO block (e.g., smaller than a size of an SCU). Such SAO blocks may choose and/or indicate an SAO encoding mode (e.g., the SAO block's own SAO encoding mode, such as "OFF," "NEW," and "MERGE"). A selection of an encoding mode may be based on rate distortion cost minimization.

An SAO split flag may be indicated at an SCU level and may be used to indicate a size of a current SAO processing unit in a bitstream. An SAO split flag may be used to store merge information, for example, in blocks, 1410, 1440, and 1450 shown in FIG. 14.

Merge information may be determined by a decoder that may derive such merge information according to a status of an SAO split flag.

In an adaptive SAO block method and/or system, a flag (e.g., an additional SCU/CTU level SAO flag that may be labeled split_sao_flag) may be used to save bits and/or to save associated merge information.

For example, where a flag that may be labeled split_sao_flag may be equal to 0, this flag may indicate that a current SAO size may be equal to an SCU. Where a flag that may be labeled split_sao_flag may be equal to 1, this flag may indicate that a current SAO size may be equal to a predefined SAO block. Syntax Table 9 illustrates syntax that may be used in an example.

TABLE 9

Exemplary Coding Unit Level Syntax

| coding_tree_unit( ) { | Descriptor |
|---|---|
|   super_block_coding_mode | ae(v) |
|   xCtb = ( CtbAddrInRs % PicWidthInCtbsY ) << CtbLog2SizeY | |
|   yCtb = ( CtbAddrInRs / PicWidthInCtbsY ) << CtbLog2SizeY | |
|   if( slice_sao_luma_flag || slice_sao_chroma_flag ){ | |
|     split_sao_flag | ae(v) |
|     if(!split_sao_flag) | |
|       sao( xCtb >> CtbLog2SizeY, yCtb >> CtbLog2SizeY ) | |
|     else | |
|       for(saoblk=0; saoblk< num_of_sao_blk;saoblk++) | |
|         sao( xCtb >> CtbLog2SizeY, yCtb >> CtbLog2SizeY ) | |
|   } | |
|   coding_quadtree( xCtb, yCtb, CtbLog2SizeY, 0 ) | |
| } | |

An adaptive SAO method and/or system may operate without using an SAO split flag. To reduce a number of overhead bits used in signaling a flag that may be labeled split_sao_flag, a super-block level coding mode may be used. Such a super-block level coding mode may be labeled super_—block_coding_mode and may, for example, indicate an SAO block size.

Where an SCU-to-CTU mode may be selected, a current super-block may belong to a homogeneous region and/or a larger SAO size may be preferred. A current SAO size may be set to a size of an SCU. Where a Direct-CTU mode may be selected, a current SAO size may be set a size of a predefined SAO block. A table of exemplary syntax is provided below in Table 10.

TABLE 10

Exemplary Coding Unit Level Syntax

| coding_tree_unit( ) { | Descriptor |
|---|---|
|   super_block_coding_mode | ae(v) |
|   xCtb = ( CtbAddrInRs % PicWidthInCtbsY ) << CtbLog2SizeY | |
|   yCtb = ( CtbAddrInRs / PicWidthInCtbsY ) << CtbLog2SizeY | |
|   if( slice_sao_luma_flag || slice_sao_chroma_flag ){ | |
|     if(super_block_coding_mode) | |
|       sao( xCtb >> CtbLog2SizeY, yCtb >> CtbLog2SizeY ) | |
|     else | |
|       for(saoblk=0; saoblk< num_of_sao_blk;saoblk++) | |
|         sao( xCtb >> CtbLog2SizeY, yCtb >> CtbLog2SizeY ) | |

TABLE 10-continued

Exemplary Coding Unit Level Syntax

| coding_tree_unit( ) { | Descriptor |
|---|---|
| } | |
| coding_quadtree( xCtb, yCtb, CtbLog2SizeY, 0 ) | |
| } | |

Figure 15:
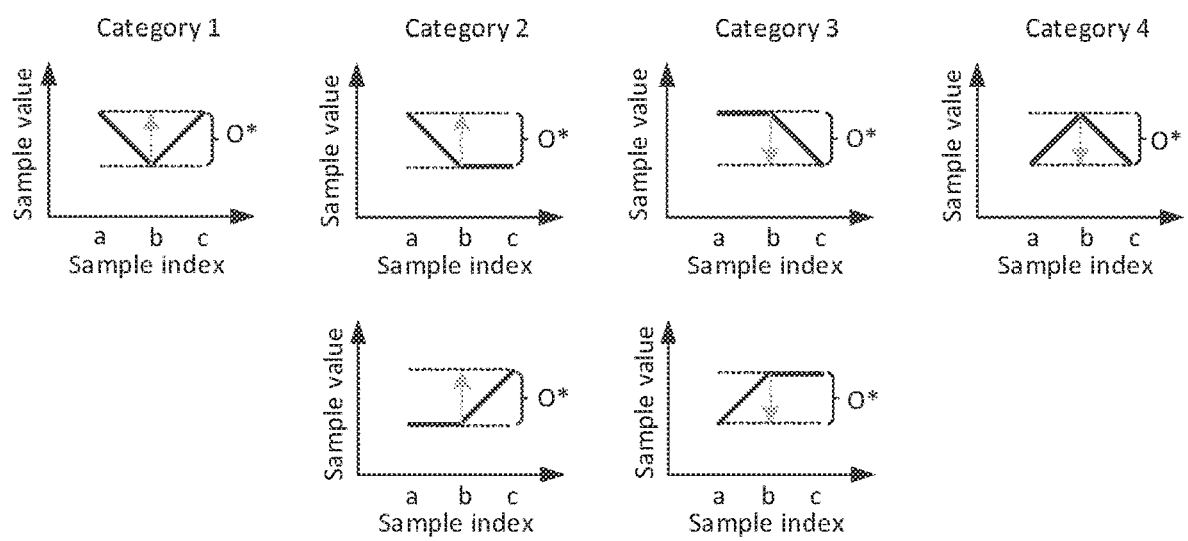
FIG. 15 shows diagrams illustrating example edge offset (EO) clippings.

In an EO mode, and referring now to FIG. 15, an offset may be obtained from samples in an SAO block. Such an offset may be computed with a minimum rate-distortion cost globally. Such an offset's value may be too large for a local sample, which may result in a local over-offsetting. For example, category 1 of diagrams 1500 shown in FIG. 5 illustrates that over-offsetting, after an SAO process, may result in a "local valley" that may be filtered as a "local peak." To address an over-offsetting effect, an actual offset may be clipped (e.g., may be clipped according to the neighboring samples).

Where c may be a current sample, a and b may be two neighboring samples, and o may be a computed EO offset determined by video coding software (where o may be a positive constant or may always be a positive constant), a maximum possible EO offset $o_{max}$, may be defined as:

$$o_{max} = \max(\text{abs}(a-c), \text{abs}(b-c)) \quad (5)$$

where max(•) may denote a maximum function and/or abs(•) may denote an absolute function. A clipped value of o*, as defined in the following equation, may provide a restoration that may be improved compared to an original restoration:

$$o^* = \max(0, \min(o, o_{max})) \quad (6)$$

where min(•) may denote the minimum function.

FIG. 15 illustrates an exemplary clipping range. A distance between two dashed lines shown in each diagram of diagrams 1500 may be a maximum EO offset $o_{max}$, which may be further extended in a more general case:

$$o_{max} = K \times \max(\text{abs}(a-c), \text{abs}(b-c)) \quad (7)$$

where K may be a constant that may be dependent on input content. For example, a value of K may be ½ or 1.

Although features and elements may be described herein in particular combinations, one of ordinary skill in the art will appreciate that each feature or element may be used alone or in any combination with other features and elements. In addition, the disclosed methods and systems may be implemented in a computer program, software, or firmware, each of which that may be incorporated into a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A decoding device comprising:
a processor configured to:
receive a partition mode indicator indicating at least one of a first partition mode or a second partition mode for decoding a coding unit (CU), wherein the first partition mode indicates that the CU is to be N×N partitioned into equally sized sub-block, wherein N is greater than 2, and the second partition mode indicates that the CU is to be partitioned into variably sized sub-blocks;
obtain a partition mode for decoding the CU based on the partition mode indicator;
determine whether at least one split coding unit flag associated with the CU based on the partition mode is to be decoded, wherein on a condition that the partition mode is the first partition mode, determining that the at least one split coding unit flag associated with the CU is bypassed; and
decode the CU based on the partition mode.

2. The decoding device of claim 1, wherein the processor is further configured to:
determine that the partition mode is the first partition mode; and
partition the CU into equally sized sub-blocks based on determining that the partition mode is the first partition mode.

3. The decoding device of claim 2, wherein the processor is further configured to:
determine the number of the equally sized sub-blocks based on a number indicator indicated in a signal.

4. The decoding device of claim 1, wherein the processor is further configured to:
determine that the partition mode is the second partition mode; and
partition the CU into variably sized sub-blocks based on determining that the partition mode is the second partition mode.

5. The decoding device of claim 1, wherein the processor is further configured to:
determine that the partition mode is the first partition mode; and
obtain a value of N based on at least one of a maximum width of a super-block, a maximum height of a super-block, a depth of minimum coding unit (MCU) relative to the CU, or a depth of a Coding Tree Unit (CTU) relative to the CU.

6. A method comprising:
receiving a partition mode indicator indicating at least one of a first partition mode or a second partition mode for a coding unit (CU), wherein the first partition mode indicates that the CU is to be N×N partitioned into equally sized sub-blocks, wherein N is greater than 2, and the second partition mode indicates that the CU is to be partitioned into variably sized sub-blocks;
obtaining a partition mode for decoding the CU based on the partition mode indicator;
determining whether at least one split coding unit flag associated with the CU based on the partition mode is to be decoded, wherein on a condition that the partition mode is the first partition mode, determining that the at least one split coding unit flag associated with the CU is bypassed; and
decoding the CU based on the partition mode.

7. The method of claim 6, further comprising:
determining that the partition mode is the first partition mode; and
partitioning the CU into equally sized sub-blocks based on determining that the partition mode is the first partition mode.

8. The method of claim 7, further comprising determining the number of the equally sized sub-blocks based on a number indicator indicated in a signal.

9. The method of claim 6, further comprising:
determining that the partition mode is the second partition mode; and
partitioning the CU into variably sized sub-blocks based on determining that the partition mode is the second partition mode.

10. The method of claim 6, further comprising:
determining that the partition mode is the first partition mode; and
obtaining a value of N based on at least one of a maximum width of a super-block, a maximum height of a super-block, a depth of minimum coding unit (MCU) relative to the CU, or a depth of a Coding Tree Unit (CTU) relative to the CU.

11. An encoding device comprising:
a processor configured to:
receive a video frame comprising a plurality of coding units (CUs);
for a CU from among the plurality of CUs, select a partition mode from among a plurality of partition modes, wherein a first partition mode from among the plurality of partition modes indicates that the CU is to be N×N partitioned into equally sized sub-blocks, wherein N is greater than 2, and wherein a second partition mode from among the plurality of partition modes indicates that the CU is to be partitioned into variably sized sub-blocks;
partition the CU into a plurality of sub-blocks based on the selected partition mode;
determine whether to include at least one split coding unit flag associated with the CU in a bitstream based on the partition mode, wherein on a condition that the partition mode is the first partition mode, the at least one split coding unit flag associated with the CU is skipped in the bitstream; and
encode the CU and an indication of the partition mode.

12. The encoding device of claim 11, wherein the processor configured to select the partition mode from among the plurality of partition modes comprises the processor configured to select the partition mode based on at least one of block complexity, rate distortion analysis, a rate distortion cost, or whether the CU comprises a homogenous region.

13. The encoding device of claim 11, wherein the processor is further configured to determine that the video frame comprises a complex region and, based on determining that the video frame comprises the complex region, select the first partition mode.

14. The encoding device of claim 13, wherein the processor is further configured to encode a number indicator that indicates the number of the equally sized sub-blocks.

15. The encoding device of claim 11, wherein the processor is further configured to determine that the video frame comprises a homogenous region and, based on determining that the video frame comprises the homogenous region, select the second partition mode.

16. The encoding device of claim 11, wherein the processor is further configured to include the indication of the partition mode for the CU in a bitstream.

17. The encoding device of claim 16, wherein the processor is further configured to include a number that indicates the number of the equally sized sub-blocks in the bitstream.

18. The encoding device of claim 11, wherein the partition mode is selected from among the plurality of partition modes, based on whether the CU comprises a homogenous region, and the processor is further configured to:
based on determining that the video frame comprises a non-homogenous region, select the first partition mode; and
based on determining that the video frame comprises the homogenous region, select the second partition mode.

19. The decoding device of claim 1, wherein based at least in part on a condition that the partition mode is the second partition mode, the at least one split coding unit flag associated with the CU is received, and the CU is partitioned based on the at least one split coding unit flag.

20. The decoding device of claim 1, wherein on a condition that the partition mode is the second partition mode, the CU is partitioned into variably sized sub-blocks based on the at least one split coding unit flag associated with the CU, and on a condition that the partition mode is the first partition mode, the processor is further configured to obtain a value of N.

21. The decoding device of claim 20, wherein the value of N is obtained based on at least one of a number indicator associated with the CU indicated in a bitstream, a maximum width of a super-block, a maximum height of a super-block, a depth of minimum coding unit (MCU) relative to the CU, or a depth of a Coding Tree Unit (CTU) relative to the CU.

* * * * *